United States Patent
Yang et al.

(10) Patent No.: US 10,437,738 B2
(45) Date of Patent: Oct. 8, 2019

(54) STORAGE DEVICE PERFORMING HASHING-BASED TRANSLATION BETWEEN LOGICAL ADDRESS AND PHYSICAL ADDRESS

(71) Applicant: SAMSUNG ELECTRONICS CO., LTD., Suwon-si, Gyeonggi-Do (KR)

(72) Inventors: Seungjun Yang, Hwaseong-si (KR); Ji Hyung Park, Yongin-si (KR); Hyunjung Shin, Yongin-si (KR)

(73) Assignee: SAMSUNG ELECTRONICS CO., LTD., Suwon-si, Gyeonggi-Do (KR)

( * ) Notice: Subject to any disclaimer, the term of this patent is extended or adjusted under 35 U.S.C. 154(b) by 0 days.

(21) Appl. No.: 15/820,019

(22) Filed: Nov. 21, 2017

(65) Prior Publication Data
US 2018/0210841 A1   Jul. 26, 2018

(30) Foreign Application Priority Data

Jan. 25, 2017 (KR) .................. 10-2017-0012215

(51) Int. Cl.
*G06F 12/1018* (2016.01)
*G06F 12/02* (2006.01)

(52) U.S. Cl.
CPC ...... *G06F 12/1018* (2013.01); *G06F 12/0238* (2013.01); *G06F 12/0292* (2013.01);
(Continued)

(58) Field of Classification Search
CPC .... G06F 12/1018; G06F 3/06; G06F 12/0238; G06F 12/0292; G06F 2212/1016;
(Continued)

(56) References Cited

U.S. PATENT DOCUMENTS 5,463,739 A * 10/1995 Albaugh ................. G06F 12/08
                                                                 710/116
8,024,545 B2    9/2011 Kim et al.
(Continued)

FOREIGN PATENT DOCUMENTS

KR        1020150045073        4/2015

*Primary Examiner* — Charles Rones
*Assistant Examiner* — Tong B. Vo
(74) *Attorney, Agent, or Firm* — F. Chau & Associates, LLC

(57) ABSTRACT

A storage device includes memory devices and a controller. The controller translates a logical address received from a host to a physical address for the memory devices. The controller manages first correspondence information associated with correspondence relationships between logical addresses and physical addresses. The controller manages translation information that includes information of a minimal perfect hash (MPH) function. The MPH function is generated by using logical addresses indicating a memory region of a reference size as key values, when a size of a memory region indicated by logical addresses managed in the first correspondence information reaches the reference size. The controller manages second correspondence information associated with correspondence relationships between the logical addresses used as the key values and the MPH function of the translation information.

20 Claims, 20 Drawing Sheets

US 10,437,738 B2
Page 2

(52) U.S. Cl.
CPC .......... *G06F 2212/1016* (2013.01); *G06F 2212/1044* (2013.01); *G06F 2212/657* (2013.01); *G06F 2212/7201* (2013.01)

(58) Field of Classification Search
CPC ....... G06F 2212/1044; G06F 2212/657; G06F 2212/7201
See application file for complete search history.

(56) References Cited

U.S. PATENT DOCUMENTS

| | | | |
|---|---|---|---|
| 8,495,280 B2 | 7/2013 | Kang et al. | |
| 8,838,936 B1 | 9/2014 | Salessi et al. | |
| 8,924,663 B2 | 12/2014 | Szczepkowski et al. | |
| 9,075,710 B2 * | 7/2015 | Talagala | G06F 12/0246 |
| 9,122,588 B1 * | 9/2015 | Mondal | G06F 12/0246 |
| 9,223,511 B2 | 12/2015 | Rudelic | |
| 9,268,653 B2 | 2/2016 | Kimmel et al. | |
| 9,298,604 B2 | 3/2016 | Sengupta et al. | |
| 9,477,589 B2 | 10/2016 | Moon et al. | |
| 9,575,661 B2 | 2/2017 | Dor et al. | |
| 2005/0193165 A1 * | 9/2005 | Sakaguchi | G06F 12/0866 711/113 |
| 2012/0011144 A1 * | 1/2012 | Transier | G06F 17/3033 707/769 |
| 2012/0198206 A1 * | 8/2012 | Park | G06F 12/1441 711/206 |
| 2014/0032935 A1 * | 1/2014 | Kim | G06F 21/6218 713/193 |
| 2014/0310476 A1 * | 10/2014 | Kruus | G06F 12/0871 711/133 |
| 2015/0058595 A1 * | 2/2015 | Gura | G06F 12/1018 711/206 |
| 2015/0074341 A1 * | 3/2015 | Marukame | G06F 17/30982 711/103 |
| 2017/0147499 A1 * | 5/2017 | Mohan | G06F 3/0616 |

* cited by examiner

STORAGE DEVICE PERFORMING HASHING-BASED TRANSLATION BETWEEN LOGICAL ADDRESS AND PHYSICAL ADDRESS

CROSS-REFERENCE TO RELATED APPLICATIONS

This application claims priority under 35 U.S.C. § 119 to Korean Patent Application No. 10-2017-0012215 filed on Jan. 25, 2017, the disclosure of which is incorporated by reference herein in its entirety.

TECHNICAL MELD

The present disclosure relates to an electronic device, and more particularly, to operations and configurations of a storage device that stores/outputs data.

DISCUSSION OF THE RELATED ART

An electronic storage device includes a memory device for storing or outputting data. The memory device includes a plurality of memory locations for storing data. Memory locations are identified and indicated based on values referred to as addresses. In the memory device, data is stored at a memory location indicated by an address, or is output from a memory location indicated by an address. The electronic storage device may suitably manage addresses to control the memory device.

In some cases, an address processed by a host device disposed outside of the storage device may be different from an address indicating a memory location within the memory device. Accordingly, the storage device may perform address translation (e.g., address mapping) between an address processed by the host device and an address of the memory device.

For example, the storage device may manage an address mapping table. The address mapping table may include information associated with a mapping relationship between addresses. The storage device may translate an address processed by the host device to an address of the memory device by referring to the address mapping table.

As the capacity of a memory device increases, the size of the address mapping table also increases. The address mapping table requires allocation of a resource (e.g., a buffer or a cache) in the storage device. Thus, the increase in the size of the address mapping table may decrease management efficiency of the storage device.

SUMMARY

Exemplary embodiments of the present disclosure provide a storage device configured to perform address translation between a logical address processed by a host and a physical address of a memory device. In exemplary embodiments, the storage device may perform address translation by using a hash function and a hashing operation, instead of providing full mapping between a logical address and a physical address.

In exemplary embodiment, the storage device includes memory devices and a controller. The controller may control the memory devices based on a request and a logical address that are received from the host. The controller may translate the logical address received from the host to a physical address of the memory devices.

In exemplary embodiments, the controller manages first correspondence information associated with a correspondence relationship between logical addresses and physical addresses. The controller manages translation information that includes information of a minimal perfect hash (MPH) function. The MPH function is generated by using logical addresses indicating a memory region of a reference size as key values when a size of a memory region in the memory devices indicated by logical addresses managed in the first correspondence information reaches the reference size. The controller manages second correspondence information associated with a correspondence relationship between the logical addresses used as the key values and the MPH function of the translation information.

In exemplary embodiments, the controller determines whether the received logical address is managed in either one of first correspondence information indicating a first correspondence relationship or second correspondence information indicating a second correspondence relationship. The first correspondence relationship includes a correspondence relationship between a first plurality of logical addresses and a plurality of physical addresses. The second correspondence relationship includes a correspondence relationship between a plurality of MPH functions, of which each is generated based on one group of logical addresses, and a second plurality of logical addresses. When the received logical address is managed in the second correspondence information, the controller may obtain a physical address associated with the received logical address based on the received logical address and a selected MPH function corresponding to the received logical address from among the plurality of MPH functions.

In exemplary embodiments, when the received logical address is managed in first correspondence information indicating a correspondence relationship between a plurality of perfect hash functions, of which each is generated based on one group of logical addresses, and a plurality of logical addresses, the controller may obtain a physical address of the memory devices associated with the received logical address based on the received logical address and a perfect hash function corresponding to the received logical address from among the plurality of perfect hash functions.

In exemplary embodiments, a storage device includes a plurality of memory devices and a controller. The controller is configured to translate a logical address received from a host to a physical address of the memory devices. The logical address is one of a plurality of logical addresses and the physical address is one of a plurality of physical addresses. The controller is further configured to manage first correspondence information associated with a correspondence relationship between the logical addresses and the physical addresses. The controller is further configured to manage translation information that includes information of a minimal perfect hash (MPH) function. The MPH function is generated when a size of a first memory region in the memory devices reaches a reference size. The first memory region is indicated by logical addresses managed in the first correspondence information, and the MPH function is generated using the logical addresses indicating the first memory region as key values. The controller is further configured to manage second correspondence information associated with a correspondence relationship between the logical addresses used as the key values and the MPH function of the translation information.

In exemplary embodiments, a storage device includes a plurality of memory devices, and a controller configured to control the memory devices based on a request and a logical address received from a host. The controller is further configured to determine whether the received logical address is managed according to either one of first correspondence information indicating correspondence relationships between a first plurality of logical addresses and a plurality of physical addresses, or second correspondence information indicating correspondence relationships between a plurality of minimal perfect hash (MPH) functions and a second plurality of logical addresses. Each of the plurality of MPH functions is generated based on one group of logical addresses. The controller is further configured to obtain a physical address associated with the received logical address based on the received logical address and a selected MPH function corresponding to the received logical address from among the plurality of MPH functions when the received logical address is managed according to the second correspondence information.

In exemplary embodiments, a storage device includes a plurality of memory devices and a controller. The controller is configured to receive a first logical address, and to obtain a first physical address of the memory devices based on the first logical address and a first perfect hash function when the first logical address is managed according to first correspondence information indicating correspondence relationships between a plurality of perfect hash functions and a first plurality of logical addresses. The first physical address is associated with the first logical address, the first logical address is included in the first plurality of logical addresses, and the first perfect hash function is included in the plurality of perfect hash functions. The first perfect hash function corresponds to the first logical address, and each of the plurality of perfect hash functions is generated based on one group of logical addresses.

In exemplary embodiments, a storage device includes a plurality of memory devices and a controller. The controller is configured to translate a logical address received from a host to a physical address of the memory devices. The logical address is one of a plurality of logical addresses and the physical address is one of a plurality of physical addresses. The controller is further configured to manage the logical addresses by referring to first correspondence information until a size of a memory region indicated by the logical addresses reaches a reference size. The first correspondence information indicates correspondence relationships between the logical addresses and the physical addresses. The controller is further configured to manage the logical addresses by referring to second correspondence information and translation information that includes information of a minimal perfect hash (MPH) function when the size of the memory region reaches the reference size. The second correspondence information indicates correspondence relationships between the logical addresses and the MPH function, and the logical addresses are used to generate the MPH function in response to the size of the memory region reaching the reference size.

According to exemplary embodiments, an amount of metadata to be referenced to perform address translation between a logical address and a physical address may be significantly reduced. Such metadata may occupy a small amount of the resources in the storage device. An available resource that is not occupied by the metadata may be used to perform other operations of the storage device. Accordingly, management efficiency of the storage device may be improved.

BRIEF DESCRIPTION OF THE DRAWINGS

The above and other features of the present disclosure will become more apparent by describing in detail exemplary embodiments thereof with reference to the accompanying drawings. Like reference numerals may refer to like elements throughout the accompanying drawings.

DETAILED DESCRIPTION OF THE EXEMPLARY EMBODIMENTS

Figure 1:
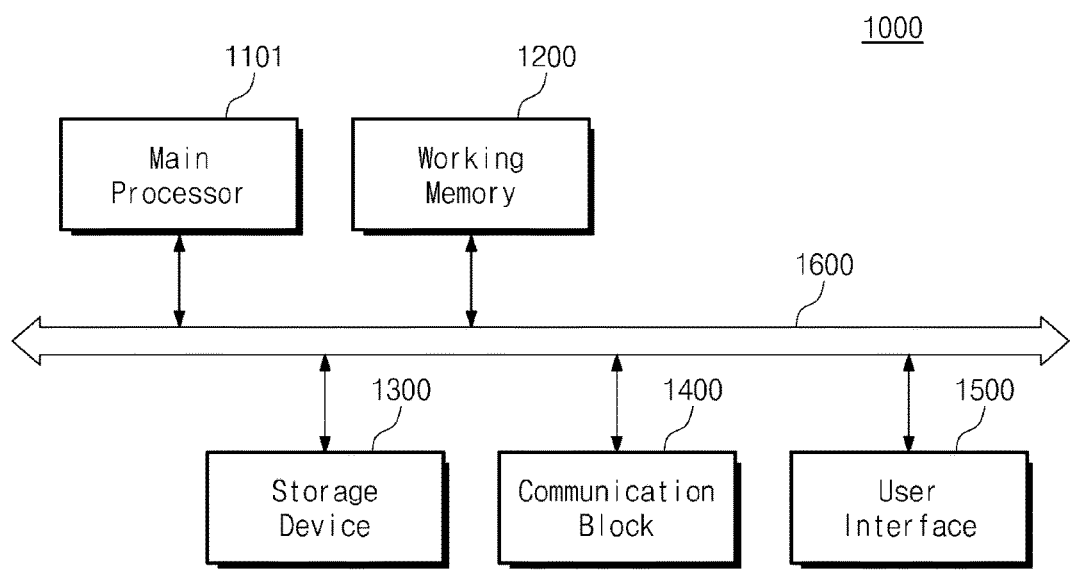
FIG. 1 is a block diagram illustrating an example of a configuration of an electronic device that includes a storage device according to exemplary embodiments of the present disclosure.

Exemplary embodiments of the present disclosure will be described more fully hereinafter with reference to the accompanying drawings. Like reference numerals may refer to like elements throughout the accompanying drawings.

Herein, it will be understood that the terms "first" "second," "third," etc. are used to distinguish one element from another, and the elements are not limited by these terms. Thus, a "first" element in an exemplary embodiment may be described as a "second" element in another exemplary embodiment.

I. Overall Configuration of System

FIG. 1 is a block diagram illustrating an example of a configuration of an electronic device 1000 that includes a storage device according to exemplary embodiments of the present disclosure.

The electronic device 1000 may include a main processor 1101, a working memory 1200, a storage device 1300, a communication block 1400, a user interface 1500, and a bus 1600. The electronic device 1000 may be, for example, a desktop computer, a laptop computer, a tablet computer, a smartphone, a wearable device, a video game console, a workstation, a server, an electric vehicle, etc.

The main processor 1101 may control overall operations of the electronic device 1000. The main processor 1101 may process various kinds of arithmetic operations and/or logical operations. To this end, the main processor 1101 may include a special-purpose logic circuit (e.g., a field programmable gate array (FPGA), application specific integrated chips (ASICs), etc.) configured to process operations. For example, the main processor 1101 may include one or more processor cores, and may be implemented with a general-purpose processor, a special-purpose processor, or an application processor.

The working memory 1200 may store data used in an operation of the electronic device 1000. For example, the working memory 1200 may temporarily store data processed or to be processed by the main processor 1101. The working memory 1200 may be used as a buffer or a cache of the electronic device 1000. The working memory 1200 may include, for example, a volatile memory such as a static random access memory (SRAM), a dynamic RAM (DRAM), a synchronous DRAM (SDRAM), etc., and/or a nonvolatile memory such as a flash memory, a phase-change RAM (PRAM), a magneto-resistive RAM (MRAM), a resistive RAM (ReRAM), a ferroelectric RAM (FRAM), etc.

The storage device 1300 may include one or more memory devices and a controller. The memory device of the storage device 1300 may store data regardless of whether power is supplied to the storage device 1300. For example, the storage device 1300 may include a nonvolatile memory device such as a flash memory, a PRAM, a MRAM, a ReRAM, a FRAM, etc. For example, the storage device 1300 may include a storage medium such as a solid state drive (SSD), a card storage, an embedded storage, etc.

The communication block 1400 may communicate with an external device/system of the electronic device 1000. For example, the communication block 1400 may support at least one of various wireless communication protocols such as long term evolution (LTE), worldwide interoperability for microwave access (WiMax), global system for mobile communication (GSM), code division multiple access (CDMA), Bluetooth, near field communication (NFC), wireless fidelity (Wi-Fi), radio frequency identification (RFID), etc., and/or at least one of various wired communication protocols such as transfer control protocol/internet protocol (TCP/IP), universal serial bus (USB), Firewire, etc.

The user interface 1500 may arbitrate communication between a user and the electronic device 1000. For example, the user interface 1500 may include input interfaces such as a keyboard, a mouse, a keypad, a button, a touch panel, a touch screen, a touch pad, a touch ball, a camera, a microphone, a gyroscope sensor, a vibration sensor, etc. The user interface 1500 may include output interfaces such as, for example, a liquid crystal display (LCD) device, a light emitting diode (LED) display device, an organic LED (OLED) display device, an active matrix OLED (AMO-LED) display device, a speaker, a motor, etc.

The bus 1600 may provide a communication path between components of the electronic device 1000. The components of the electronic device 1000 may exchange data with one another based on a bus format of the bus 1600. For example, the bus format may include one or more of various interface protocols such as USB, small computer system interface (SCSI), peripheral component interconnect express (PCIe), mobile PCIe (M-PCIe), advanced technology attachment (ATA), parallel ATA (PATA), serial ATA (BATA), serial attached SCSI (SAS), integrated drive electronics (IDE), enhanced IDE (EIDE), nonvolatile memory express (NVMe), universal flash storage (UFS), etc.

The storage device 1300 may be implemented based on exemplary embodiments of the present disclosure. For example, the storage device 1300 may perform address translation. In exemplary embodiments of the present disclosure, the storage device 1300 may perform the address translation based on a hash function and a hashing operation. Exemplary configurations and operations of the storage device 1300 will be described with reference to FIGS. 2 to 26.

It is to be understood that the storage device 1300 is not limited to the storage device 1300 described herein. For example, according to exemplary embodiments of the present disclosure, the storage device 1300 may be employed in any type of device including a memory element. For example, exemplary embodiments of the present disclosure may be employed in a volatile memory and/or a nonvolatile memory included in the working memory 1200.

Figure 2:
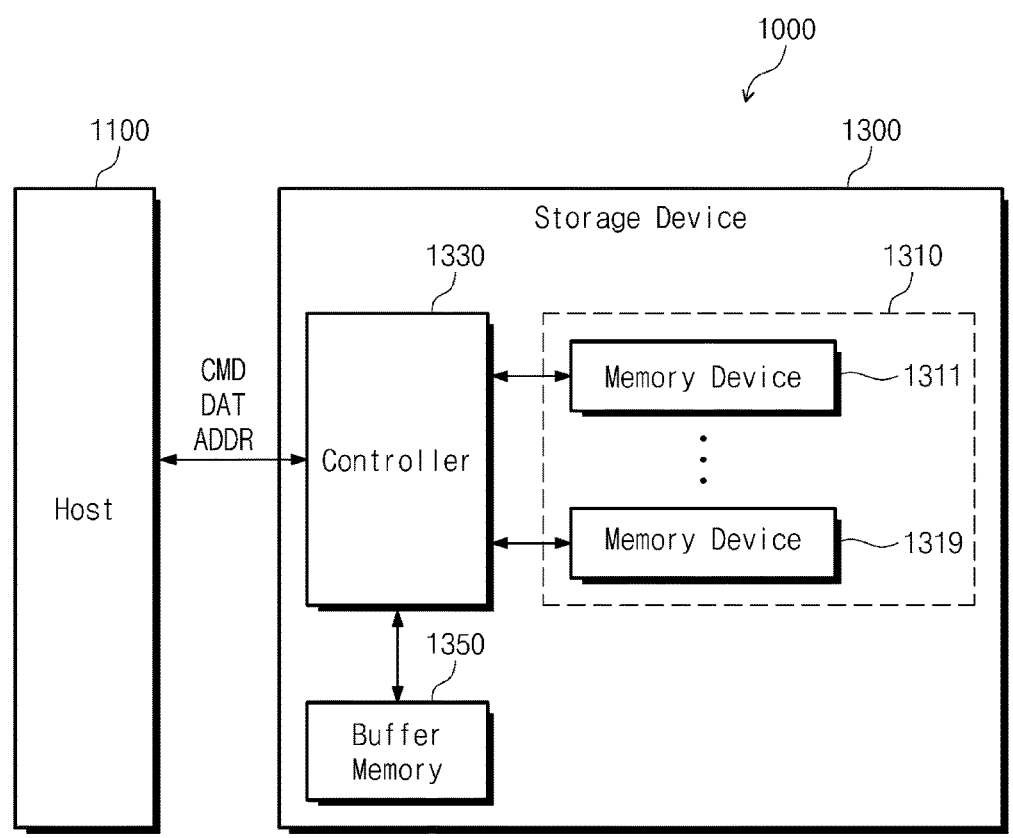
FIG. 2 is a block diagram illustrating an example of a configuration of the storage device of FIG. 1 according to exemplary embodiments of the present disclosure.

FIG. 2 is a block diagram illustrating an example of a configuration of the storage device 1300 of FIG. 1 according to exemplary embodiments of the present disclosure.

As described with reference to FIG. 1, the main processor 1101 may communicate with the storage device 1300 through the bus 1600. In the present disclosure, an object that is able to access the storage device 1300 may be referred to as a host 1100. The main processor 1101 is an example of the object which is able to operate as the host 1100, but the present disclosure is not limited thereto. For example, the host 1100 may be the main processor 1101, but is not limited thereto.

The host 1100 may exchange data DAT with the storage device 1300. The storage device 1300 may provide a storage service with the host 1100 in response to a command CMD received from the host 1100.

For example, the host 1100 may provide a write command and write data to the storage device 1300. The storage device 1300 may store the requested write data in response to the write command. For example, the host 1100 may provide a read command to the storage device 1300. The storage device 1300 may output requested read data to the host 1100 in response to the read command.

The storage device 1300 may include one or more memory devices 1310 and a controller 1330. The number of memory devices included in the storage device 1300 may be variously changed or modified.

The memory device 1310 may include a plurality of memory devices. For example, the memory device 1310 may include memory devices 1311 to 1319. Each of the memory devices 1311 to 1319 may store data requested by the host 1100. To this end, each of the memory devices 1311 to 1319 may include memory region(s) for storing data. For example, when each of the memory devices 1311 to 1319 includes a NAND type flash memory, each of the memory devices 1311 to 1319 may include an array of memory cells formed along a plurality of word lines and a plurality of bit lines. However, as described with reference to FIG. 1, a type and a configuration of each of the memory devices 1311 to 1319 may be variously changed or modified.

Each of the memory devices 1311 to 1319 may include memory locations for storing data. A memory location may be identified and indicated based on a value referred to as an address. For example, write data may be stored at a memory location indicated by an address, and read data may be output from a memory location indicated by an address. According to exemplary embodiments, one memory region may include a plurality of memory locations respectively indicated by a plurality of addresses.

The host 1100 may provide an address ADDR to the storage device 1300 to exchange data in association with a specific memory location or a specific memory region of the memory devices 1311 to 1319. The storage device 1300 may control the memory devices 1311 to 1319 based on a request (e.g., the command CMD) and the address ADDR which are received from the host 1100.

The address ADDR processed by the host 1100 may be different from an address indicating a memory location inside the memory devices 1311 to 1319. For example, the address ADDR processed by the host 1100 may be referred to as a logical address, and the address of the memory devices 1311 to 1319 may be referred to as a physical address. The storage device 1300 may perform address translation between a logical address processed by the host 1100 and a physical address of the memory devices 1311 to 1319 to properly control the memory devices 1311 to 1319.

The controller 1330 may control overall operations of the storage device 1300. For example, the controller 1330 may schedule operations of the memory devices 1311 to 1319, or may encode and decode signals/data to be processed in the storage device 1300. For example, the controller 1330 may control the memory devices 1311 to 1319 such that the memory devices 1311 to 1319 store or output data.

The controller 1330 may include one or more hardware components (e.g., an analog circuit, a logic circuit, etc.) that are configured to perform functions described above and to be described further below. Additionally or alternatively, the controller 1330 may include one or more processor cores. Functions of the controller 1330 which are described above and further described below may be implemented with program code of software and/or firmware, and the processor core(s) of the controller 1330 may execute an instruction set of the program code. The processor core(s) of the controller 1330 may process various kinds of arithmetic operations and/or logical operations to execute the instruction set.

A buffer memory 1350 may buffer data used in an operation of the storage device 1300. For example, the buffer memory 1350 may temporarily store data to be referred to by the controller 1330. For example, the buffer memory 1350 may temporarily store data to be stored in the memory devices 1311 to 1319 and/or data output from the memory devices 1311 to 1319. The buffer memory 1350 may include, for example, a volatile memory such as a SRAM, a DRAM, a SDRAM, etc., and/or a nonvolatile memory such as a flash memory, a PRAM, an MRAM, a ReRAM, a FRAM, etc.

Figures 3, 4:
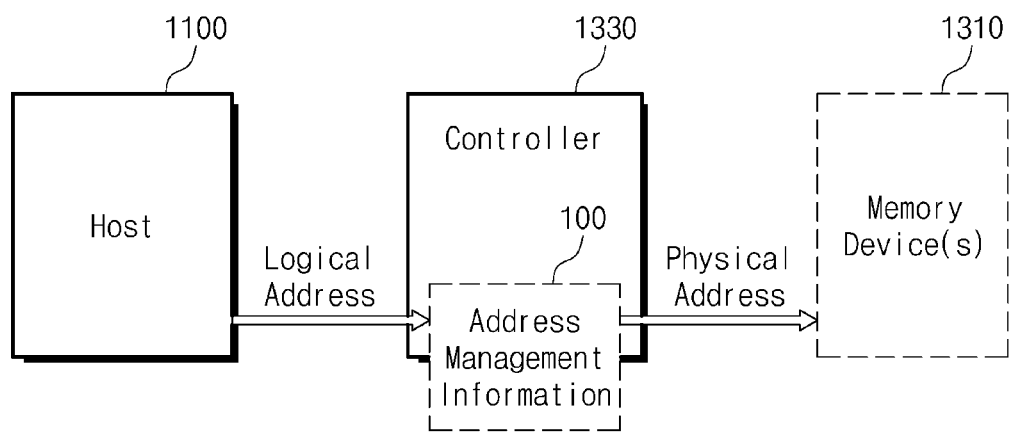
FIG. 3 is a conceptual diagram for describing address translation performed in the storage device of FIG. 2 according to exemplary embodiments of the present disclosure.
FIG. 4 is a table illustrating an example of information that may be referenced to perform address translation according to exemplary embodiments of the present disclosure.

FIG. 3 is a conceptual diagram for describing address translation performed in the storage device 1300 of FIG. 2 according to exemplary embodiments of the present disclosure.

In exemplary embodiments, the controller 1330 may perform address translation between a logical address and a physical address. The controller 1330 may translate a logical address received from the host 1100 to a physical address of the memory devices 1310. Accordingly, even though a logical address provided from the host 1100 is different from a physical address indicating a specific memory location of the memory devices 1310, the controller 1330 may control the memory devices 1310 based on the translated physical address.

The controller 1330 may manage address management information 100 to perform the address translation. The address management information 100 may include metadata that is referenced to perform the address translation between a logical address and a physical address. The controller 1330 may generate/modify/update/invalidate a variety of information included in the address management information 100. In addition, the controller 1330 may perform the address translation based on the variety of information included in the address management information 100.

For example, the address management information 100 may be stored in the buffer memory 1350 of FIG. 2. Alternatively, the address management information 100 may be stored in a cache memory inside the controller 1330 or in the memory devices 1310. In some cases, the address management information 100 may be distributively stored in at least one of the buffer memory 1350, the cache memory inside the controller 1330, and/or the memory devices 1310. The controller 1330 may access a memory which stores the address management information 100 to perform the address translation.

FIG. 4 is a table illustrating an example of information that may be referenced to perform address translation according to exemplary embodiments of the present disclosure.

In exemplary embodiments, the controller 1330 of FIG. 3 may manage a full mapping table FMT. The full mapping table FMT may include information associated with a mapping relationship between logical addresses La to Lz and physical addresses Pa to Pz. The full mapping table FMT may be implemented as a type of a look-up table. The controller 1330 may translate a logical address to a physical address by referring to the full mapping table FMT.

For example, the logical address La may correspond to the physical address Pa. When the controller 1330 receives the logical address La from the host 1100 of FIG. 3, the controller 1330 may map the logical address La to the physical address Pa. Accordingly, the controller 1330 may process a request received from the host 1100 together with the logical address La, in association with a memory location indicated by the physical address Pa.

For example, the full mapping table FMT may be used to fully manage the physical addresses Pa to Pz of the memory devices 1310 of FIG. 3 (e.g., the physical addresses Pa to Pz managed in the full mapping table FMT may fully cover all memory regions in the memory devices 1310). In such an example, even though the controller 1330 receives any logical address from the host 1100, the controller 1330 is able to map the received logical address to a physical address which corresponds to the received logical address by referring to the full mapping table FMT. That is, in exemplary embodiments, any logical address received by the controller 1330 from the host 1100 may be mapped to a physical address corresponding to the received logical address by referring only to the full mapping table FMT, without having to refer to any additional mapping tables other than the full mapping table FMT.

However, when a capacity of the memory devices 1310 increases, the amount of physical addresses managed in association with the memory devices 1310 may also increase. The size of the full mapping table FMT may increase as the amount of physical addresses increases. The full mapping table FMT may require allocation of a resource (e.g., the buffer memory 1350, the cache memory inside the controller 1330, and/or the memory devices 1310) in the storage device 1300 of FIG. 2. As a result, an increase in the size of the full mapping table FMT may degrade the management efficiency of the storage device 1300.

II. Example Address Translation

Figure 5:
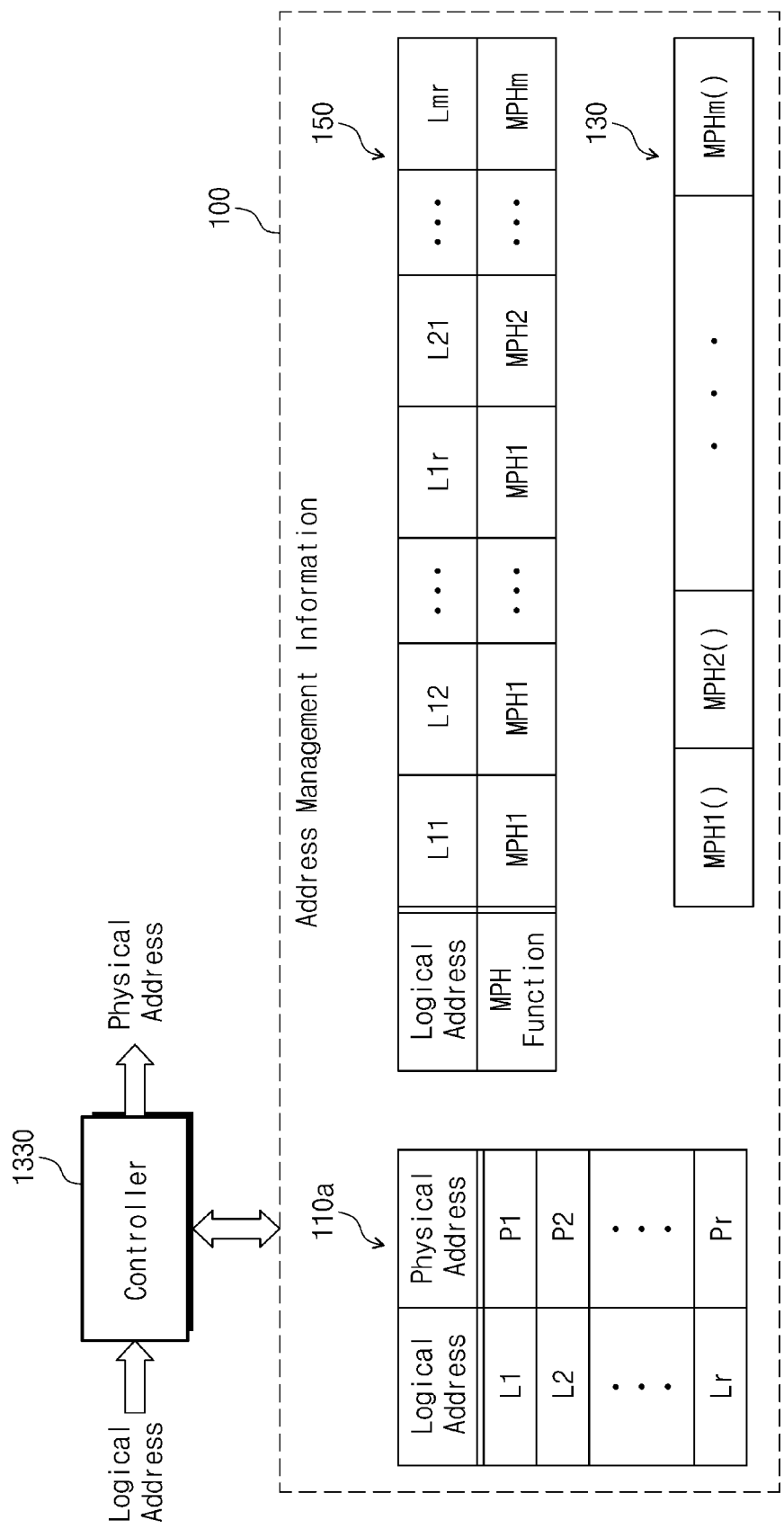
FIG. 5 is a conceptual diagram illustrating an example of information that may be included in the address management information of FIG. 3 according to exemplary embodiments of the present disclosure.

FIG. 5 is a conceptual diagram illustrating an example of information that may be included in the address management information 100 of FIG. 3 according to exemplary embodiments of the present disclosure.

As described above with reference to FIG. 3, the controller 1330 may manage a variety of information included in the address management information 100. The controller 1330 may translate a logical address to a physical address by referring to the address management information 100. In exemplary embodiments, the address management information 100 may include first correspondence information 110a, translation information 130, and second correspondence information 150.

The first correspondence information 110a may be associated with a correspondence relationship between logical addresses L1 to Lr and physical addresses P1 to Pr. For example, the first correspondence information 110a may indicate a correspondence relationship between a specific logical address and a specific physical address (e.g., the first correspondence information 110a may map a specific logical address to a specific physical address). However, unlike the full mapping table FMT of FIG. 4, in exemplary embodiments, the controller 1330 does not fully manage physical addresses of the memory devices 1310 of FIG. 3 in the first correspondence information 110a. For example, in exemplary embodiments, the first correspondence information 110a does not include all of the physical addresses that exist for the memory devices 1310 (e.g., the first correspondence information 110a does not include a mapping for every physical address in the memory devices 1310).

Instead, in exemplary embodiments, the controller 1330 manages the correspondence relationship between the logical addresses L1 to Lr and the physical addresses P1 to Pr in the first correspondence information 110a until a size of a memory region indicated by the logical addresses L1 to Lr managed in the first correspondence information 110a reaches a reference size. The reference size will be described with reference to FIG. 10.

When the size of the memory region indicated by the logical addresses L1 to Lr managed in the first correspondence information 110a reaches the reference size, the controller 1330 may manage the logical addresses L1 to Lr in association with the translation information 130 and the second correspondence information 150, and may invalidate the correspondence relationship of the first correspondence information 110a. Such operations will be further described with reference to FIGS. 10 to 15.

In exemplary embodiments, the translation information 130 may include information of a minimal perfect hash (MPH) function. For example, the translation information 130 may include information of MPH function MPH1( ) to MPHm( ). The MPH function refers to a hash function in which n elements of a first set are mapped to n elements of a second set without hash collision.

In exemplary embodiments, each of the MPH function MPF1( ) to MPHm( ) may be generated when the size of the memory region indicated by the logical addresses L1 to Lr managed in the first correspondence information 110a reaches the reference size. Each of the MPH functions MPH1( ) to MPHm( ) may be generated based on one group of logical addresses. In exemplary embodiments, each of the MPH functions MPH1( ) to MPHm( ) may be generated by using logical addresses, which indicate a memory region of the reference size, as key values. The one group of logical addresses may cover a memory region of the reference size. An example of an algorithm for generating an MPH function will be described with reference to FIGS. 7 and 8.

The second correspondence information 150 may be associated with a correspondence relationship between logical addresses L11 to Lmr and the MPH functions MPH1( ) to MPHm( ). A specific logical address of the second correspondence information 150 may be used as a key value to generate a specific MPH function, and the second correspondence information 150 may indicate a correspondence relationship between the specific logical address and the specific MPH function. Accordingly, the second correspondence information 150 may be associated with a correspondence relationship between logical addresses used as key values and MPH functions generated using the logical addresses as the key values.

Address translation using the first correspondence information 110a, the translation information 130, and the second correspondence information 150 will be described with reference to FIGS. 6 and 9.

Figure 6:
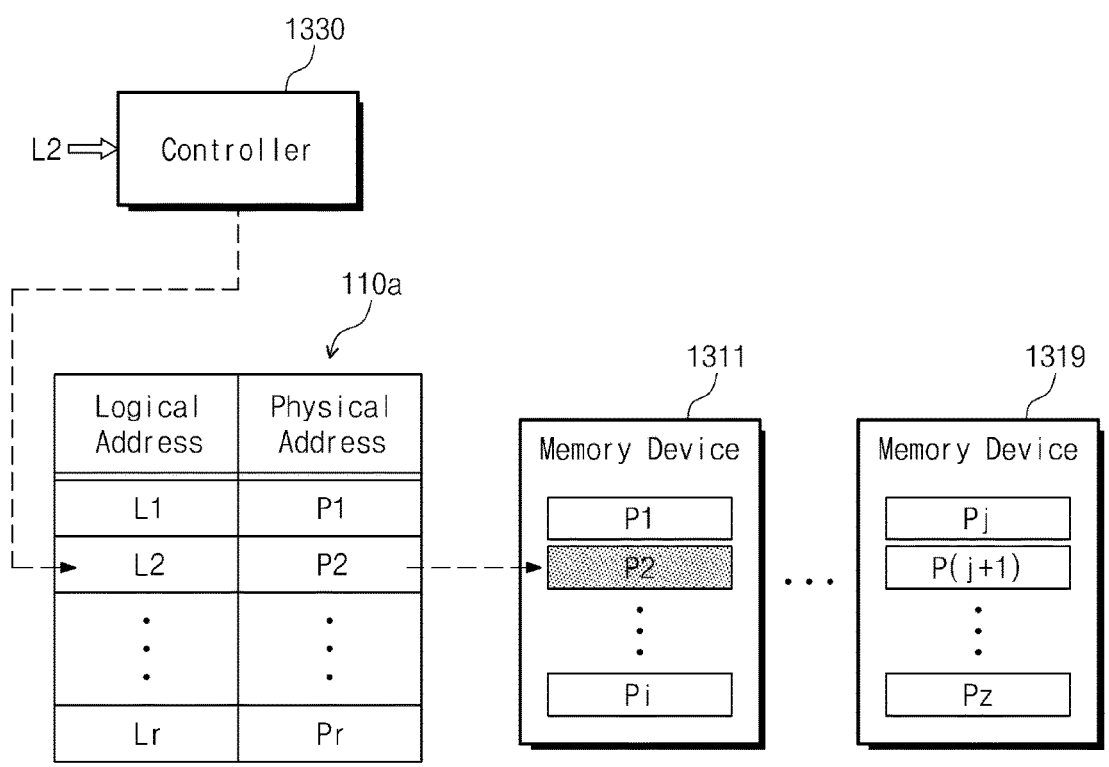
FIG. 6 is a conceptual diagram for describing an example of address translation performed by referring to the first correspondence information of the address management information of FIG. 5 according to exemplary embodiments of the present disclosure.

FIG. 6 is a conceptual diagram for describing an example of address translation performed by referring to the first correspondence information 110a of the address management information 100 of FIG. 5 according to exemplary embodiments of the present disclosure.

In some cases, a logical address received from the host 1100 of FIG. 2 may be managed in the first correspondence information 110a. As described with reference to FIG. 5, a logical address which is used as a key value to generate an MPH function may be managed in the second correspondence information 150 of FIG. 5. Accordingly, a logical address, which is not used as a key value for generating any MPH function before a size of a memory region indicated by logical addresses managed in the first correspondence information 110a reaches the reference size, may be managed in the first correspondence information 110a.

When a logical address received from the host 1100 is managed in the first correspondence information 110a, the controller 1330 may refer to the first correspondence information 110a. The controller 1330 may obtain a physical address which corresponds to the received logical address by referring to the first correspondence information 110a. Accordingly, the controller 1330 may perform address translation between the received logical address and the obtained physical address.

For example, referring to FIG. 6, the controller 1330 may receive a logical address L2 from the host 1100. The logical address L2 may be managed in the first correspondence information 110a. The controller 1330 may obtain a physical address P2 which corresponds to the received logical address L2 by referring to the first correspondence information 110a.

For example, the memory device 1311 may include memory locations indicated by physical addresses P1 to Pi, and the memory device 1319 may include memory locations indicated by physical addresses Pj to Pz. The controller 1330 may process a request of the host 1100 in association with a memory location indicated by the physical address P2.

Figure 7:
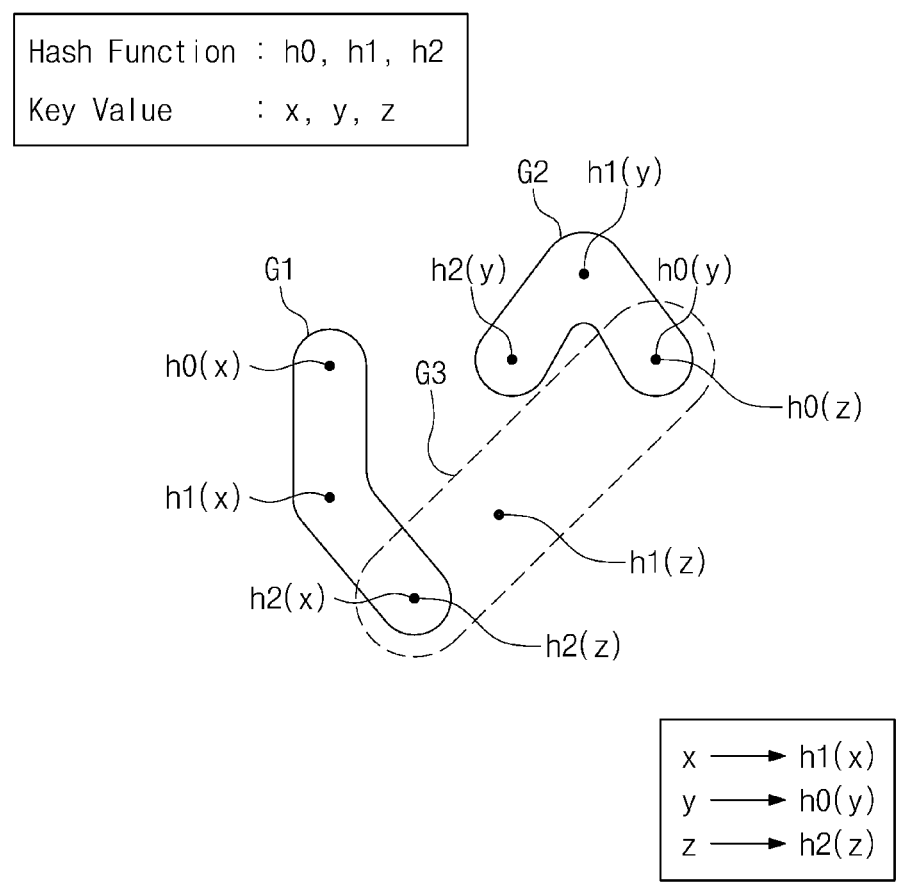
FIGS. 7 and 8 are conceptual diagrams for describing an example of a method of generating the translation information of the address management information of FIG. 5 according to exemplary embodiments of the present disclosure.
Figure 8:
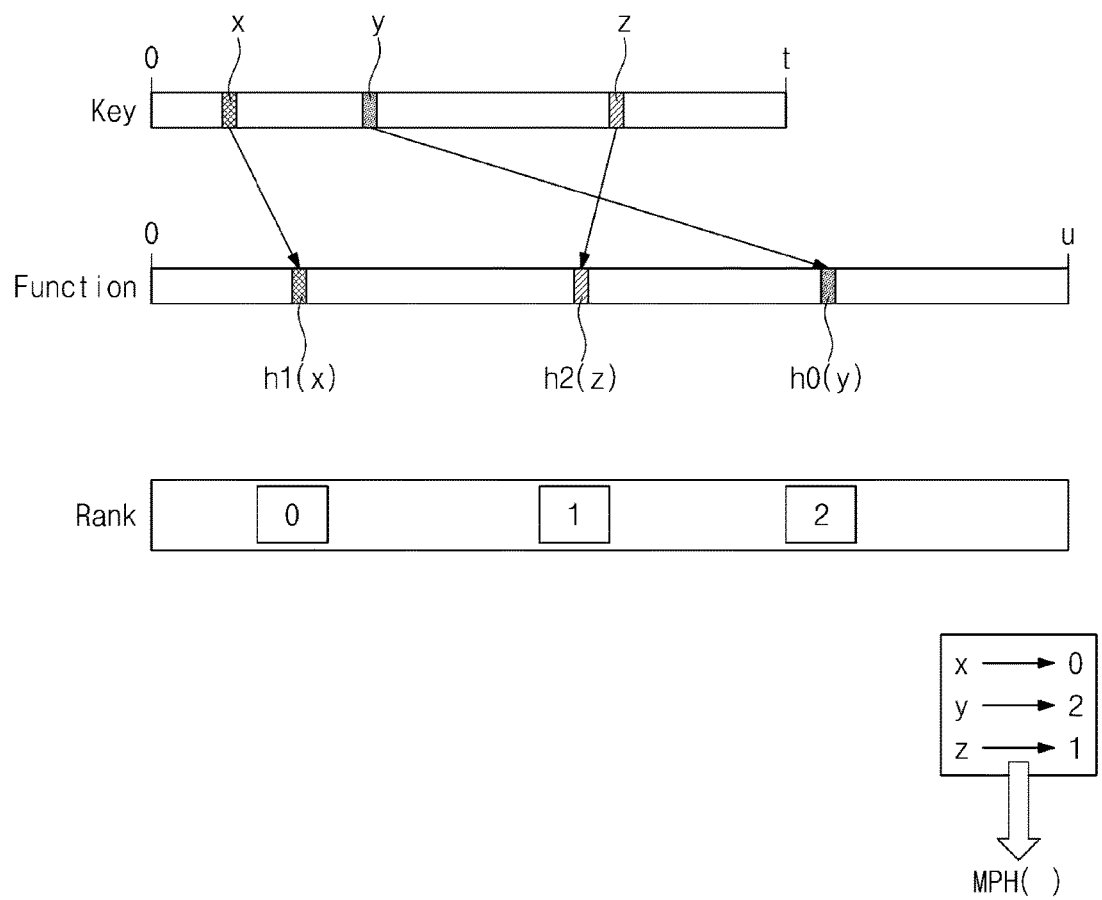

FIGS. 7 and 8 are conceptual diagrams for describing an example of a method of generating the translation information 130 of the address management information 100 of FIG. 5 according to exemplary embodiments of the present invention.

As described with reference to FIG. 5, in exemplary embodiments, the translation information 130 may include information of an MPH function. The MPH function refers to a hash function in which n elements of a first set are mapped to n elements (e.g., to the minimum number of elements) of a second set without hash collision (e.g., perfectly mapped).

Referring to FIG. 7, for example, three hash functions h0, h1, and h2 may be used to generate an MPH function. The hash functions h0, h1, and h2 may include any hash functions among various kinds of hash functions. The hash functions h0, h1, and h2 may include the same kind of hash functions or may include different kinds of hash functions.

For example, three key values x, y, and z may be used to generate an MPH function. The key values x, y, and z may be elements belonging to a first set, and may be mapped to elements of a second set through the MPH function.

For example, function values $h0(x)$, $h1(x)$, and $h2(x)$ may be calculated by substituting the key value x into the hash functions h0, h1, and h2. The function values $h0(x)$, $h1(x)$, and $h2(x)$ may form a graph G1 on a function space. The key value x may correspond to one of the function values $h0(x)$, $h1(x)$, and $h2(x)$ to generate an MPH function.

Similarly, function values $h0(y)$, $h1(y)$, and $h2(y)$ calculated by substituting the key value y into the hash functions h0, h1, and h2 may form a graph G2 on the function space. For example, when the key value y is different from the key value "x", the graph G2 may not overlap with the graph G1 even though the same hash functions h0, h1, and h2 are used. The key value y may correspond to one of the function values $h0(y)$, $h1(y)$, and $h2(y)$ to generate an MPH function.

In addition, function values $h0(z)$, $h1(z)$, and $h2(z)$ calculated by substituting the key value z into the hash functions h0, h1, and h2 may form a graph G3 on the function space. For example, in some cases, the graph G3 may overlap with the graphs G1 and G2 even though the key value z is different from the key value x or the key value y. The key value z may correspond to one of the function values $h0(z)$, $h1(z)$, and $h2(z)$ to generate an MPH function.

An MPH function may be used to avoid hash collision. Accordingly, the key values x, y, and may correspond to different function values respectively. For example, the key value x may correspond to the function value $h1(x)$, and the key value y may correspond to the function value $h0(y)$. As the graph G2 overlaps with the graph G3, the function value $h0(y)$ may be the same as the function value $h0(z)$. In this case, to avoid hash collision, the key value z may not correspond to the function value $h0(z)$. For example, the key value z may correspond to the function value $h2(z)$.

In such a manner, to avoid hash collision, function values that respectively correspond to the key values x, y, and z may be selected differently. That is, some of function values calculated using hash functions may be selected such that function values corresponding to key values are not overlapping.

It is to be understood that the graphs G1, G2, and G3 of FIG. 7 and the correspondence between the key value and the function value are provided as an example to facilitate better understanding of the present disclosure, and that the present disclosure is not limited thereto. For example, shapes of graphs obtained from hash functions may be variously changed or modified on a function space, and a correspondence between a key value and a function value may be variously changed or modified to avoid hash collision.

Referring to FIG. 8, key values between 0 and t may correspond to function values between 0 and u. For example, as described with reference to FIG. 7, the key values x, y, and z may correspond to the function values $h1(x)$, $h0(y)$, and $h2(z)$, respectively.

For example, a rank value may be allocated to each of function values depending on the magnitude of the function values. For example, rank values 0, 2, and 1 may be respectively allocated to the function values $h1(x)$, $h0(y)$, and $h2(z)$, according to an order of the function values $h1(x)$, $h2(z)$, and $h0(y)$.

Accordingly, the key value x may be mapped to the rank value 0 which is allocated to the function value $h1(x)$. Similarly, the key value y may be mapped to the rank value 2 which is allocated to the function value $h0(y)$, and the key value z may be mapped to the rank value 1 which is allocated to the function value $h2(z)$.

An MPH function MPH( ) may be generated to map the key values x, y, and z to the rank values 0, 2, and 1. When the key values x, y, and z are input to the MPH function MPH( ), the MPH function may output the rank values 0, 2, and 1 respectively. This MPH function MPH( ) may provide mapping to the minimum number of elements without hash collision.

The exemplary method described with reference to FIGS. 7 and 8 may be used to generate an MPH function in exemplary embodiments. In exemplary embodiments, one group of logical addresses may be used as key values for generating an MPH function. The MPH function may be generated to translate the logical addresses used as the key values to physical addresses. When a key value (e.g., a logical address) is input to an MPH function, the MPH function may output a value which is associated with a physical address corresponding to the input key value. This MPH function may be referenced to map the logical addresses used as the key values to physical addresses of a memory region of a reference size without collision.

The controller 1330 of FIG. 5 may include a hardware component and/or a software component to generate an MPH function. For example, the controller 1330 may include a plurality of hash operation circuits to perform operations of the hash functions h0, h1, and h2 of FIG. 7 and/or additional hash function(s). For example, processor core(s) of the controller 1330 may execute an instruction set of program code describing operations of the hash functions h0, h1, and h2 and/or additional hash function(s).

For example, the controller 1330 may include a hardware circuit and/or may execute an instruction set of associated program code by processor core(s) to calculate and select a function value as described with reference to FIG. 7. For example, the controller 1330 may include a hardware circuit and/or may execute an instruction set of associated program code by processor core(s) to allocate a rank value and generate an MPH function as described with reference to FIG. 8.

It is to be understood that FIGS. 7 and 8 are provided to facilitate better understanding of the present disclosure, and that the present disclosure is not limited thereto. For example, the number of hash functions and the number of key values used to generate an MPH function may be variously changed or modified. In addition, it is to be understood that FIGS. 7 and 8 show a simplified example of a method for generating an MPH function. Other algorithm(s) for generating an MPH function may be employed in exemplary embodiments. Moreover, some exemplary embodiments are described herein as using a "minimal" perfect hash function, however, the present disclosure is not limited thereto. For example, some exemplary embodiments may use other type(s) of perfect hash function to avoid hash collision.

Figure 9:
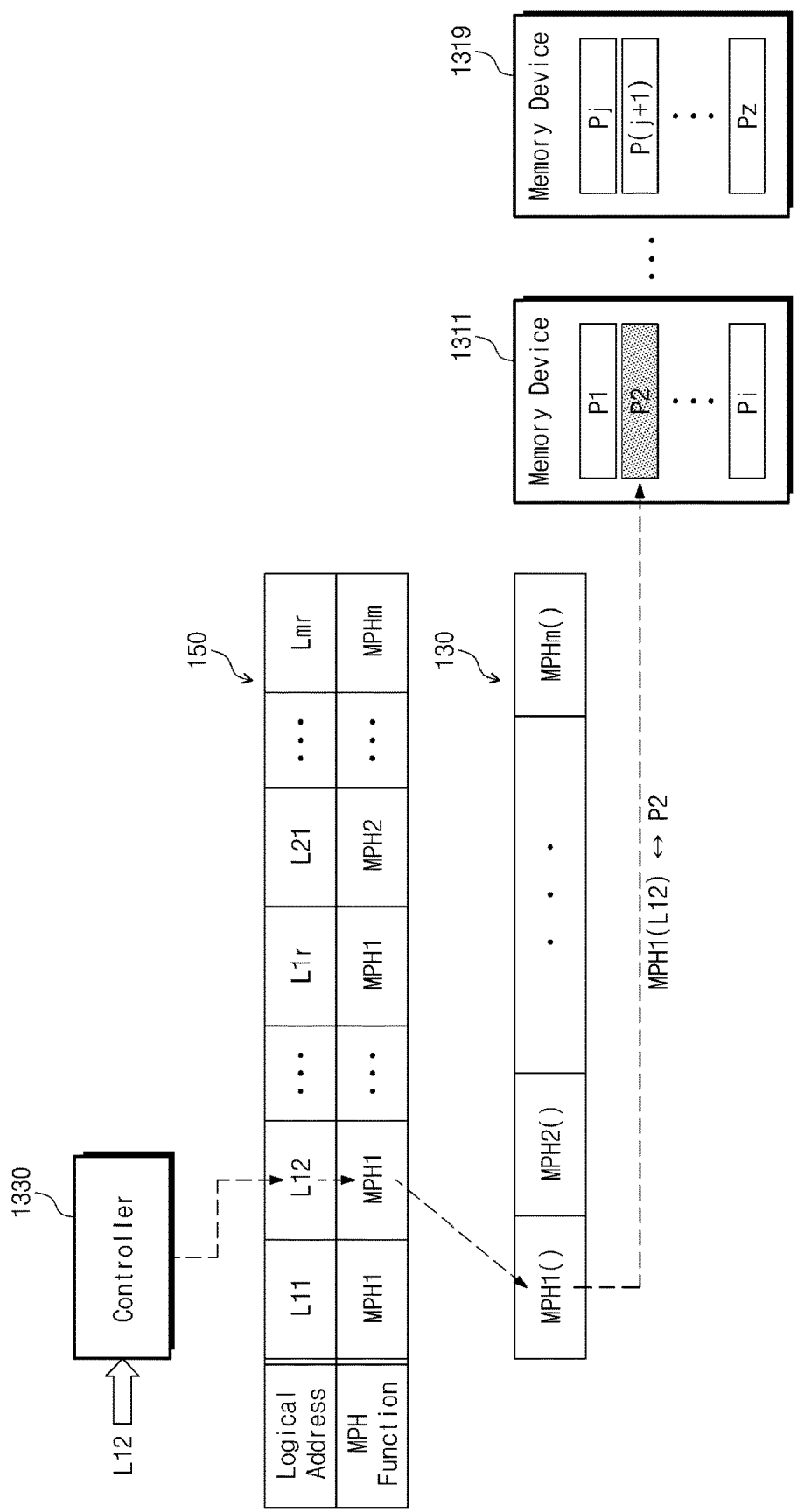
FIG. 9 is a conceptual diagram for describing an example of address translation performed by referring to the second correspondence information and the translation information of the address management information of FIG. 5 according to exemplary embodiments of the present disclosure.

FIG. 9 is a conceptual diagram for describing an example of address translation performed by referring to the second correspondence information 150 and the translation information 130 of the address management information 100 of FIG. 5 according to exemplary embodiments of the present disclosure.

In some cases, a logical address received from the host 1100 of FIG. 2 may be managed in the second correspondence information 150. As described with reference to FIG. 5, a logical address which is used as a key value to generate an MPH function may be managed in the second correspondence information 150.

When a logical address received from the host 1100 is managed in the second correspondence information 150, the controller 1330 may refer to the second correspondence information 150 first (e.g., before referring to the translation information 130). The controller 1330 may determine which MPH function corresponds to the received logical address by referring to the second correspondence information 150. The controller 1330 may then select an MPH function which corresponds to the received logical address, and may obtain information of the selected MPH function by referring to the translation information 130.

The selected MPH function may have been generated using the received logical address as one of key values. Accordingly, when the received logical address is input to the selected MPH function, the selected MPH function may output a value which is associated with a physical address corresponding to the received logical address. The controller 1330 may obtain a physical address associated with the received logical address based on the selected MPH function and the received logical address.

For example, referring to FIG. 9, the controller 1330 may receive a logical address L12 from the host 1100. The logical address L12 may be managed in the second correspondence information 150. The controller 1330 may obtain information of an MPH function MPH1 that corresponds to the received logical address L12 by referring to the second correspondence information 150 and the translation information 130.

The controller 1330 may obtain a physical address P2 that corresponds to the logical address L12 based on the MPH function MPH1 and the logical address L12. The controller 1330 may process a request of the host 1100 in association with a memory location indicated by the physical address P2.

When the second correspondence information 150 and the translation information 130 are used, the controller 1330 may manage MPH functions that are used to obtain physical addresses from logical addresses. One MPH function may be used to associate several logical addresses, which are used as key values, with several physical addresses. Accordingly, the controller 1330 may manage one MPH function for logical addresses used as key values, instead of managing each and every physical address corresponding to respective logical addresses.

As a result, according to exemplary embodiments of the present disclosure, the amount of metadata (e.g., the address management information 100) which is referenced to perform address translation between a logical address and a physical address may be significantly reduced. Such metadata may occupy a small amount of resources in the storage device 1300. The increased amount of available resources which are not used by the metadata may be used to perform other operations of the storage device 1300, improving the operation of the storage device 1300.

For example, when the size of a memory region that is occupied by the metadata in a cache memory inside the controller 1330 or the buffer memory 1350 of FIG. 2 decreases, a memory region for a read cache and/or a write cache may be sufficiently secured. For example, when the size of a memory region which is occupied by the metadata in the memory devices 1310 of FIG. 2 decreases, a memory region for thin provisioning may be sufficiently secured. Accordingly, the management efficiency of the storage device 1300 may be improved according to exemplary embodiments of the present disclosure.

III. Reference Size and Initial Setting

Figure 10:
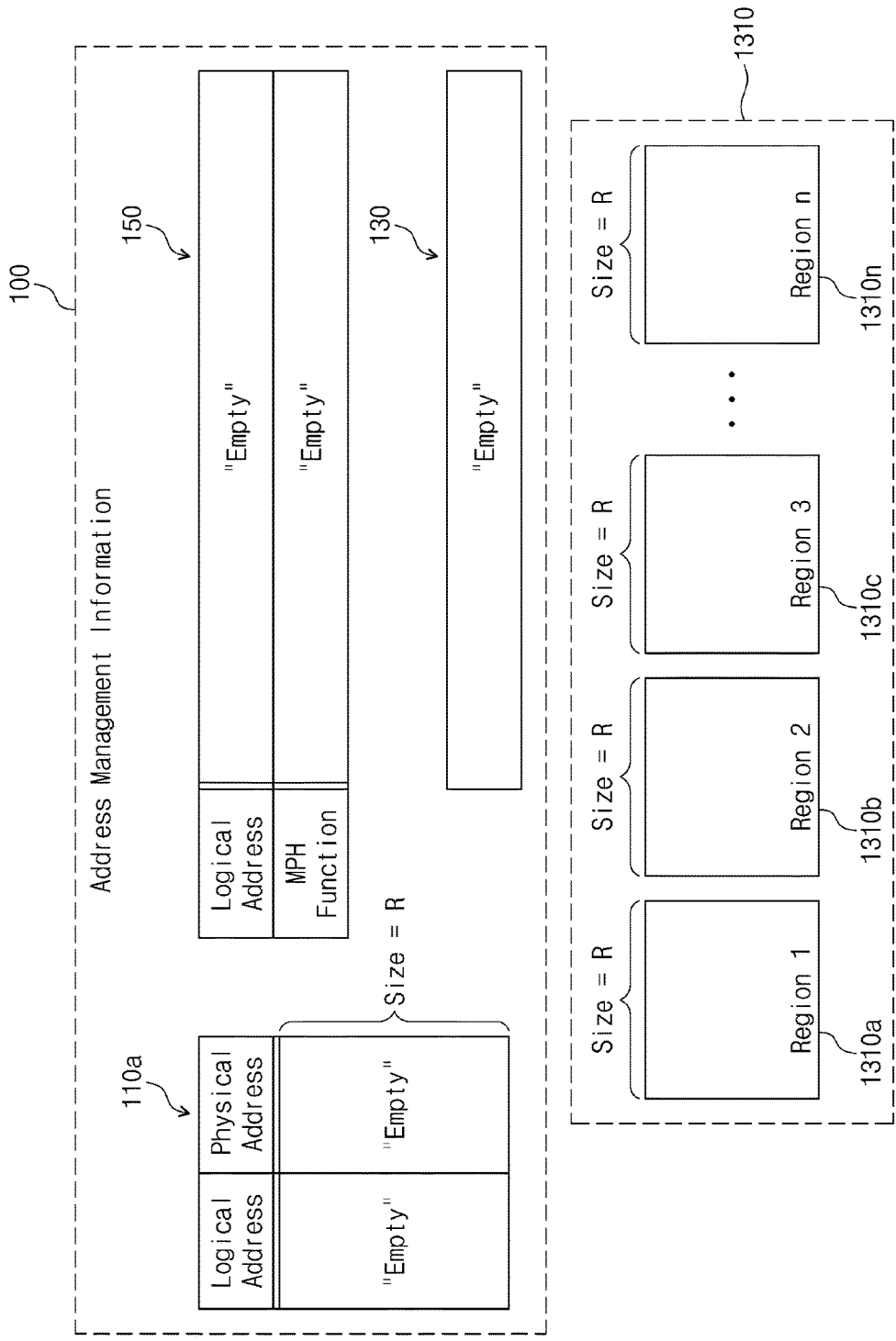
FIG. 10 is a conceptual diagram for describing an example of a configuration of the address management information of FIG. 5 and the memory devices of FIG. 2 according to exemplary embodiments of the present disclosure.

FIG. 10 is a conceptual diagram for describing an example of a configuration of the address management information 100 of FIG. 5 and the memory devices 1310 of FIG. 2 according to exemplary embodiments of the present disclosure.

The memory devices 1310 may include memory regions 1310a, 1310b, 1310c, 1310n. Each of the memory regions 1310a, 1310b, 1310c, 1310n may have a reference size R. The reference size R refers to a size of a memory region managed by the controller 1330 in association with addresses translation according to exemplary embodiments.

For example, the reference size R may correspond to a page size or a block size defined in the memory devices 1310. However, the present disclosure is not limited thereto. The reference size R may correspond to another size to be suitable to perform the address translation and to manage the address management information 100. For example, a manufacturer or a designer of the storage device 1300 may select the reference size R in advance before operation of the storage device 1300, and the controller 1330 may manage the memory devices 1310 based on the selected reference size R.

The controller 1330 may manage addresses up to the reference size R in the first correspondence information 110a. For example, as described above with reference to FIG. 5, the controller 1330 may manage a correspondence relationship between logical addresses and physical addresses in the first correspondence information 110a until a size of a memory region indicated by the logical addresses managed in the first correspondence information 110a reaches the reference size R.

The controller 1330 may manage information of MPH functions in the translation information 130. As described above with reference to FIG. 5, each of the MPH functions may be generated based on logical addresses indicating a memory region of the reference size R. The MPH functions may be generated to respectively correspond to the memory regions 1310a, 1310b, 1310c, . . . 1310n, which will be described with reference to FIGS. 16 and 17. Accordingly, the number of MPH functions managed in the translation information 130 may be changed depending on the number of memory regions of the memory devices 1310.

Once the storage device 1300 is manufactured, the whole capacity of the memory devices 1310 may be fixed. Accordingly, when the reference size R is selected to be relatively small, the number of memory regions may increase. Alternatively, when the reference size R is selected to be relatively large, the number of memory regions may decrease.

When the number of memory regions increases, the number of MPH functions managed in the translation information 130 may also increase. Accordingly, the amount of metadata managed in the translation information 130 and the second correspondence information 150 may increase. However, since the reference size R is relatively small, the amount of metadata managed in the first correspondence information 110a may decrease.

Alternatively, when the number of memory regions decreases, the amount of metadata managed in the translation information 130 and the second correspondence information 150 may decrease. However, since the reference size R is relatively large, the amount of metadata managed in the first correspondence information 110a may increase.

Accordingly, the reference size R may affect the whole size of the address management information 100, and thus, may affect the amount of metadata and performance of address translation. The reference size R may be suitably selected in view of various factors such as, for example, a purpose, an operation policy, an operation condition, required performance, a capacity of available resources, etc., of the storage device 1300.

In an initial state (e.g., immediately after the storage device 1300 is manufactured), the address management information 100 may not include any information. Accordingly, the first correspondence information 110a, the translation information 130, and the second correspondence information 150 may be empty. An example write operation performed in the initial state will be described with reference to FIGS. 11 to 15.

IV. Example Preceding Write Operation and Generation of MPH Function

Figure 11:
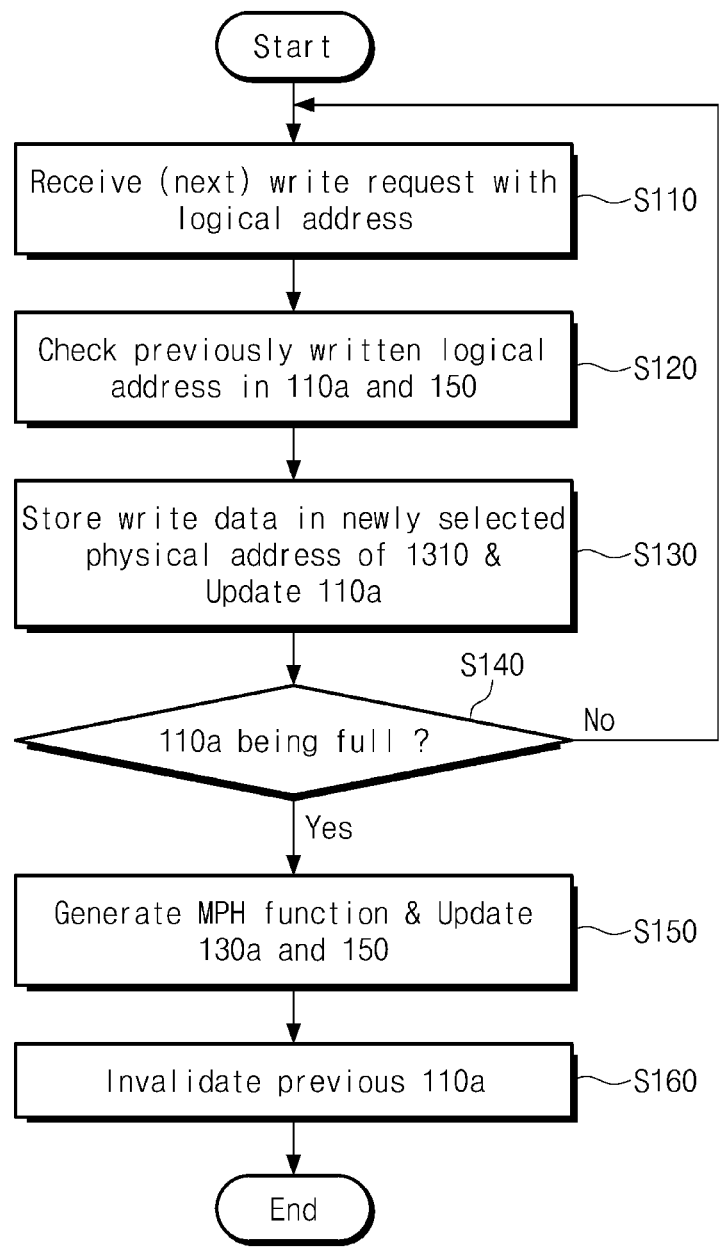
FIG. 11 is a flowchart describing an example of a write operation performed based on the address management information of FIG. 5 according to exemplary embodiments of the present disclosure.

FIG. 11 is a flowchart describing an example of a write operation performed based on the address management information 100 of FIG. 5 according to exemplary embodiments of the present disclosure. FIGS. 12 to 15 are conceptual diagrams for describing an example of configurations of the address management information 100 of FIG. 5 according to the example of the write operation of FIG. 11.

Referring to FIG. 11, in operation S110, the controller 1330 may receive a write request (e.g., a write command and write data) from the host 1100. The controller 1330 may receive a logical address from the host 1100 together with the write request. The logical address may indicate a memory location at which the write data will be stored.

In operation S120, the controller 1330 may check a logical address that has been previously written in the first correspondence information 110a and the second correspondence information 150. Accordingly, the controller 1330 may determine whether the logical address received in operation S110 is managed in either one of the first correspondence information 110a or the second correspondence information 150.

For example, in the initial state (e.g., immediately after the storage device 1300 is manufactured), the first correspondence information 110a, the translation information 130, and the second correspondence information 150 may be empty as described with reference to FIG. 10. Accordingly, in the example of FIG. 11, the controller 1330 may determine that the logical address received in operation S110 is not managed in both the first correspondence information 110a and the second correspondence information 150 (e.g., the logical address received in operation S110 is not included in the first correspondence information 110a or the second correspondence information 150). For example, each of the first correspondence information 110a and the second correspondence information 150, which are empty, may return a suitable value (e.g., a predefined value), and the controller 1330 may determine that the first correspondence information 110a and the second correspondence information 150 are empty, in response to the returned value.

In operation S130, the controller 1330 may control the memory devices 1310 such that the write data is stored at a memory location indicated by a newly selected physical address. Herein, the new physical address may be variously selected depending upon various factors such as, for example, a management condition of the memory devices 1310, an operation policy of the controller 1330, etc. In addition, the controller 1330 may update the first correspondence information 110a such that the logical address received in operation S110 corresponds to the new physical address.

Figure 12:
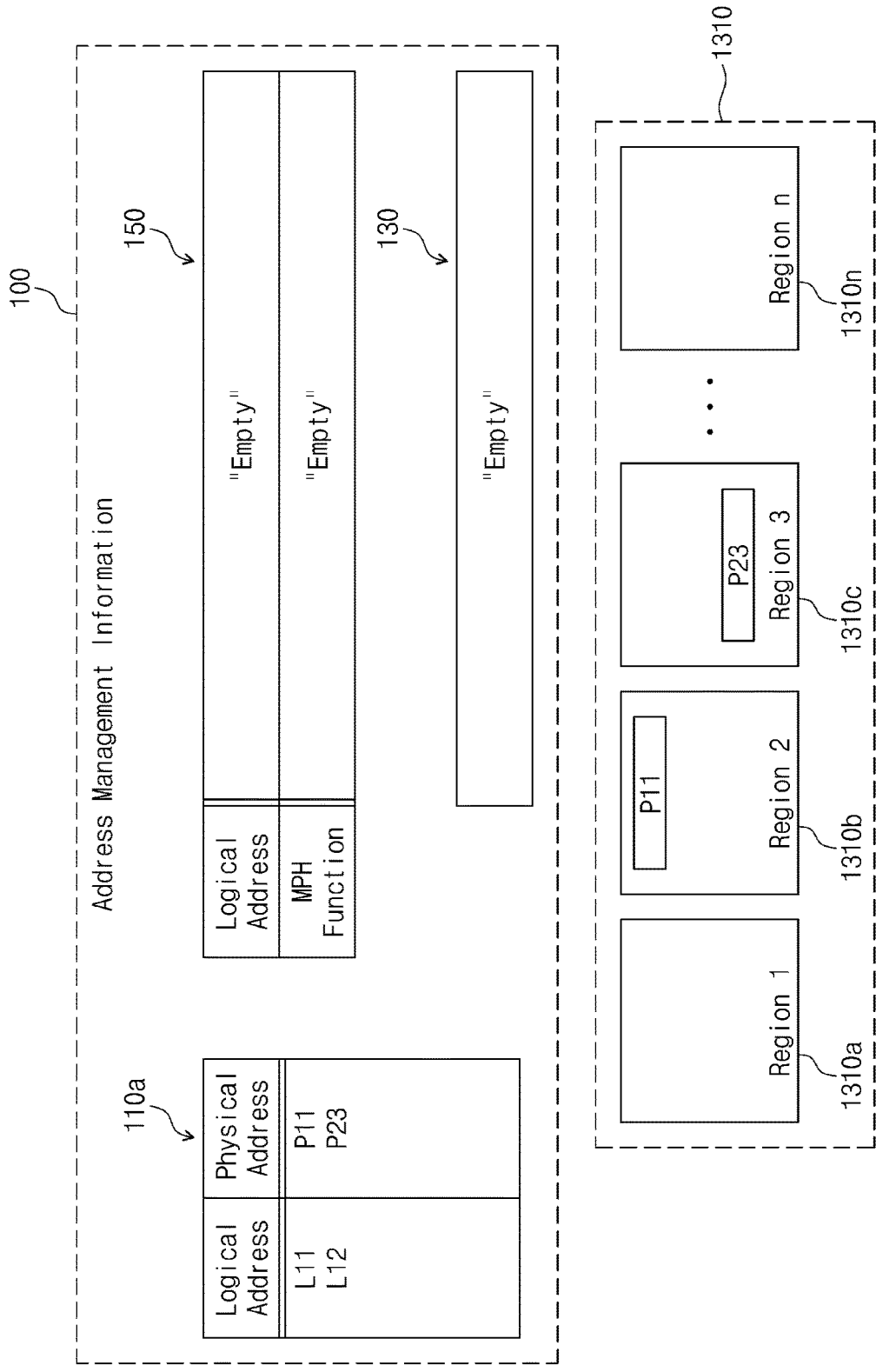
FIGS. 12 to 15 are conceptual diagrams for describing an example of configurations of the address management information of FIG. 5 according to the example of the write operation of FIG. 11 according to exemplary embodiments of the present disclosure.

Referring to FIG. 12, for example, the controller 1330 may receive a logical address L11 from the host 1100, and write data associated with the logical address L11 may be stored at a memory location indicated by a physical address P11 (e.g., a memory location included in the memory region 1310b). In this case, the controller 1330 may manage a correspondence relationship between the logical address L11 and the physical address P11 in the first correspondence information 110a.

Similarly, for example, the controller 1330 may receive a logical address L12 from the host 1100, and write data associated with the logical address L12 may be stored at a memory location indicated by a physical address P23 (e.g., a memory location included in the memory region 1310c). In this case, the controller 1330 may manage a correspondence relationship between the logical address L12 and the physical address P23 in the first correspondence information 110a.

In such a manner, the controller 1330 may manage a correspondence relationship between logical addresses and physical addresses in the first correspondence information 110a until a size of a memory region indicated by the logical addresses managed in the first correspondence information 110a reaches the reference size (e.g., R in FIG. 10). In operation S140 of FIG. 11, the controller 1330 may determine whether the first correspondence information 110a is full (e.g., whether the size of the memory region indicated by the logical addresses managed in the first correspondence information 110a has reached the reference size).

When the first correspondence information 110a is not full, the controller 1330 may receive a next write request from the host 1100 in operation S110. The first correspondence information 110a may become full as operation S110, operation S120, and operation S130 are repeated. In this case, operation S150 may be performed.

In operation S150, the controller 1330 may generate an MPH function. In exemplary embodiments, an MPH function may be generated using one group of logical addresses, which indicates a memory region of the reference size, as key values.

As the MPH function is generated, the controller 1330 may update the translation information 130 to manage information of the generated MPH function in the translation information 130. In addition, the controller 1330 may update the second correspondence information 150 such that the one group of logical addresses used as the key values corresponds to the generated MPH function.

Figure 13:
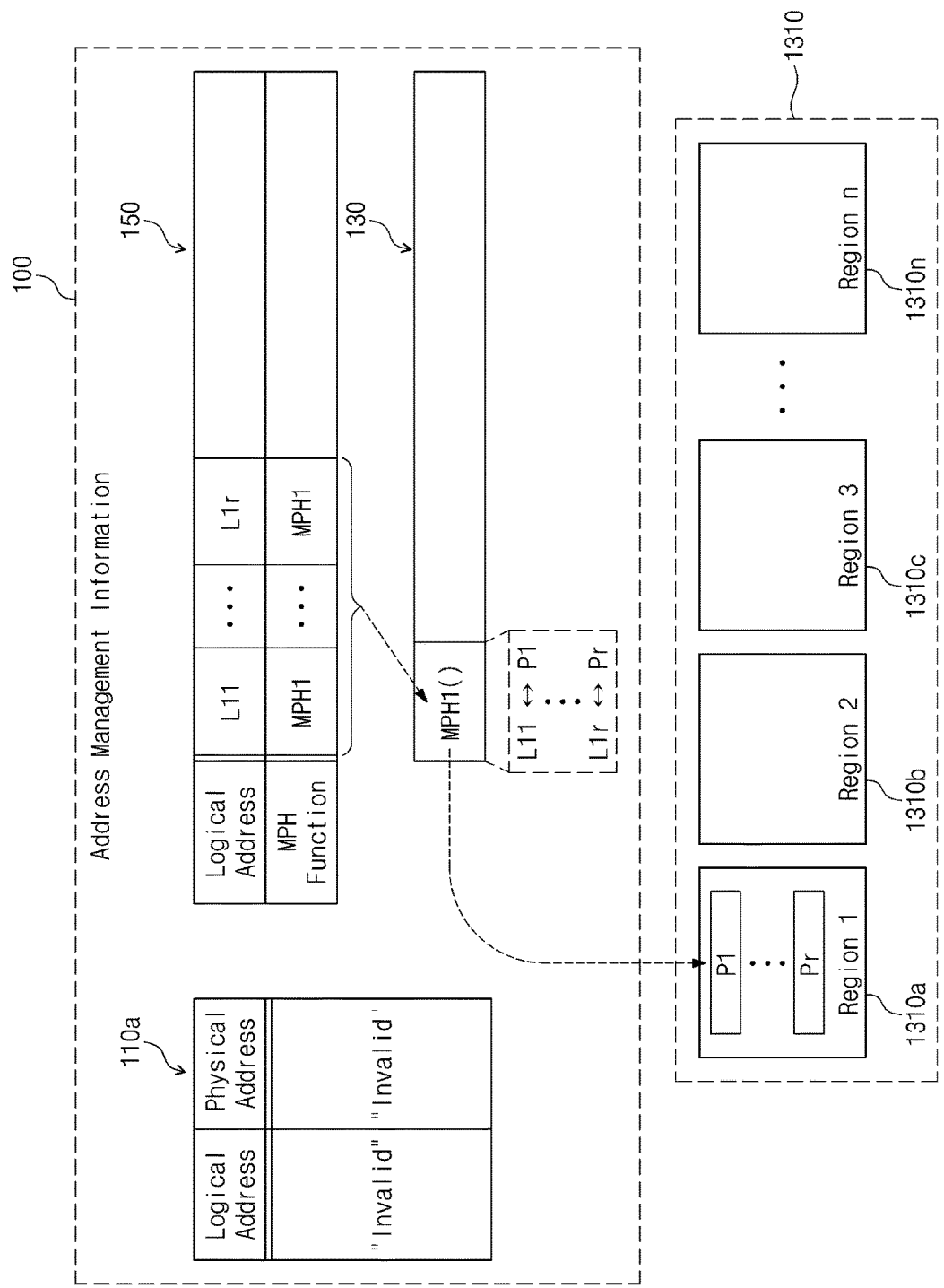

Referring to FIG. 13, for example, the first correspondence information 110a may be entirely filled. For example, the first correspondence information 110a may be filled with logical addresses L11 to L1r (e.g., the logical addresses L11 to L1r may indicate a memory region of the reference size). The controller 1330 may generate an MPH function MPH1( ) by using the logical addresses L11 to L1r as key values. The controller 1330 may generate the MPH function MPH1( ) according to receiving one group of the logical addresses L11 to L1r.

The controller 1330 may update the translation information 130 to manage information of the MPH function MPH1( ) in the translation information 130. The controller 1330 may update the second correspondence information 150 to manage a correspondence relationship between the logical addresses L11 to L1r and the MPH function MPH1( ) in the second correspondence information 150.

For example, the MPH function MPH1( ) may be generated to translate the logical addresses L11 to L1r to physical addresses P1 to Pr respectively. For example, the physical addresses P1 to Pr may indicate the memory region 1310a of the reference size. Data associated with the logical addresses L11 to L1r may be stored in the memory region 1310a based on the MPH function MPH1( ).

In exemplary embodiments, a memory location indicated by a logical address of the first correspondence information 110a may be different from a memory location indicated by a logical address of the second correspondence information 150. Accordingly, even though logical addresses of the first correspondence information 110a indicate a first memory region, logical addresses of the second correspondence information 150 may indicate a second memory region. Referring to FIGS. 12 and 13, for example, the logical address L11 of the first correspondence information 110a may indicate a memory location having the physical address P11, and the logical address L11 of the second correspondence information 150 may indicate a memory location having the physical address P1.

As the MPH function MPH1( ) is generated, the controller 1330 may control the memory devices 1310 such that the data associated with the logical addresses L11 to L1r migrate to memory locations indicated by the physical addresses P1 to Pr. For example, under control of the controller 1330, data stored at a memory location having the physical address P11 may migrate to a memory location having the physical address P1.

Accordingly, as described with reference to FIG. 9, after the MPH function MPH1( ) is generated, the logical addresses L11 to L1r may be respectively translated to the physical addresses P1 to Pr based on a correspondence relationship of the second correspondence information 150 and information of the MPH function MPH1( ) of the translation information 130. The controller 1330 may obtain the physical addresses P1 to Pr based on the MPH function MPH1( ) and the logical addresses L11 to L1r, respectively.

In operation S160 of FIG. 11, the controller 1330 may invalidate the correspondence relationship of the first correspondence information 110a in response to the MPH function being generated. Herein, the terms invalidation and invalidate refer to releasing or cancelling the correspondence relationship. Referring to FIG. 13, the controller 1330 may invalidate the correspondence relationship of the first correspondence information 110a in response to the MPH function MPH1( ) being generated. Accordingly, comparing FIG. 13 to FIG. 12, due to invalidation, the logical addresses L11 to L1r managed in the second correspondence information 150 are not managed in the first correspondence information 110a.

When the correspondence relationship of the first correspondence information 110a is invalidated, entries of the correspondence relationship may be deleted from the first correspondence information 110a. In exemplary embodiments, data associated with addresses of the deleted entries may be immediately deleted (or invalidated) from the memory devices 1310. Alternatively, in exemplary embodiments, information of the deleted entries may be temporarily stored in the buffer memory 1350 or a cache memory inside the controller 1330, and then data associated with addresses of the deleted entries may be deleted (or invalidated) from the memory devices 1310 based on the temporarily stored information while a management operation (e.g., a garbage collection operation) is performed.

Figure 14:
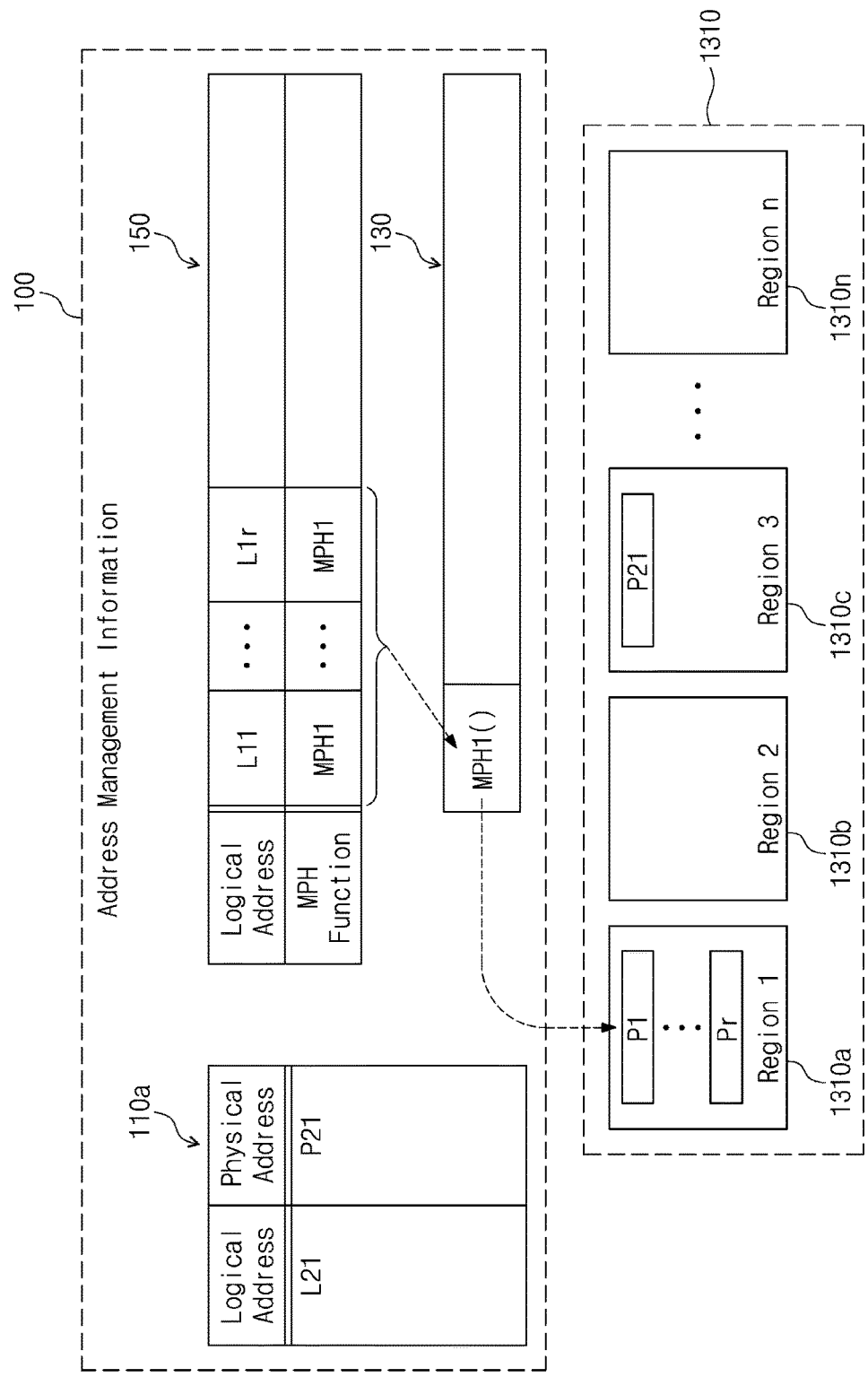

The example of the write operation of FIG. 11 may be performed again in response to a next write request. Referring to FIG. 14, for example, the controller 1330 may receive a logical address L21 from the host 1100 (operation S110 of FIG. 11). The logical address L21 may not be managed in both the first correspondence information 110a and the second correspondence information 150 (operation S120 of FIG. 11).

Accordingly, under control of the controller 1330, write data may be stored at a memory location indicated by a physical address P21. In addition, the controller 1330 may update the first correspondence information 110a for a correspondence relationship between the logical address L21 and the physical address P21 (operation S130 of FIG. 11). When the newly received logical address L21 is not managed in the second correspondence information 150, the controller 1330 may manage the newly received logical address L21 in the first correspondence information 110a.

In such a manner, the first correspondence information 110b may be filled with logical addresses L21 to L2r (operation S140 of FIG. 11). For example, the logical addresses L21 to L2r may indicate a memory region of the reference size.

Figure 15:
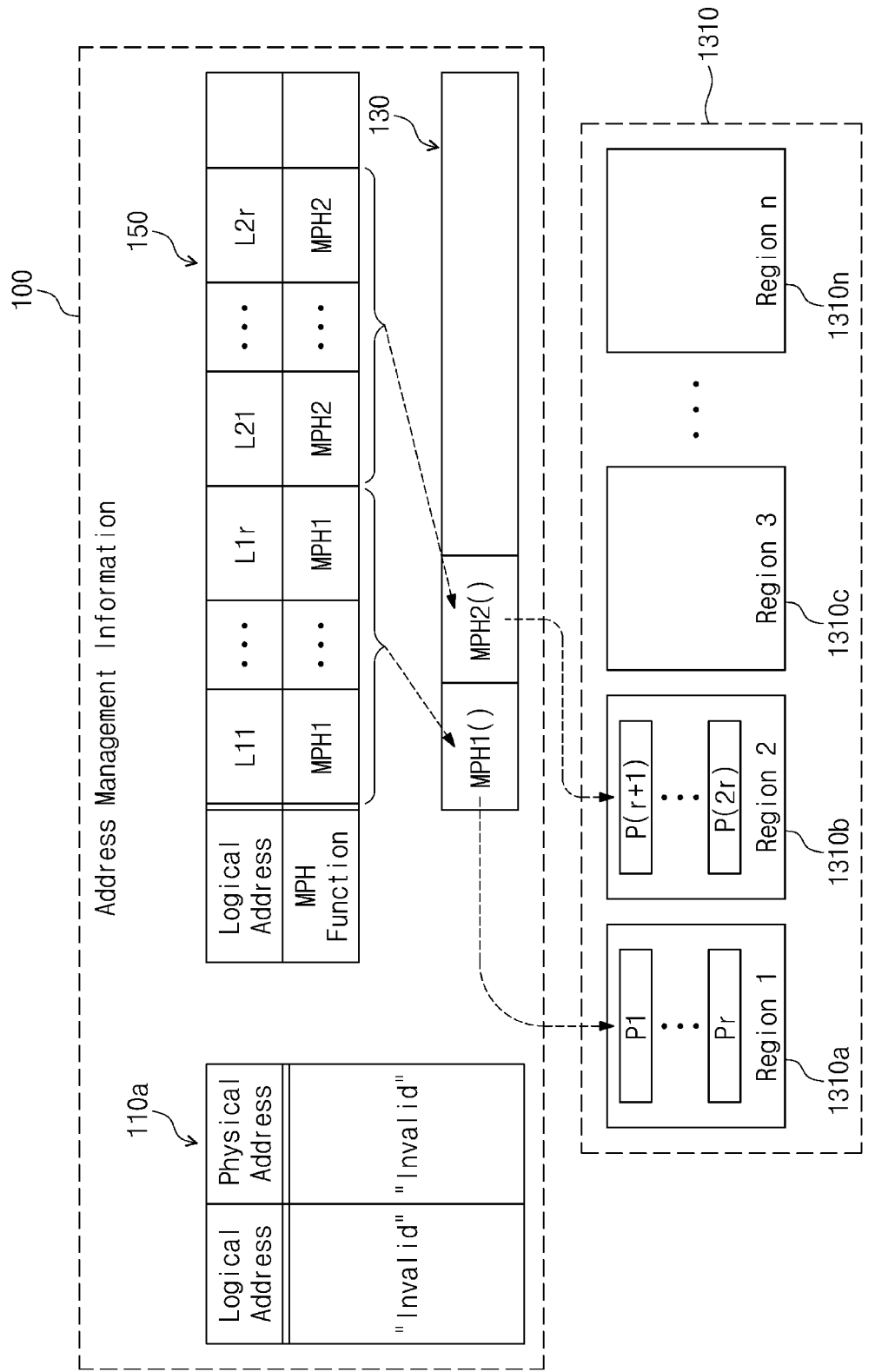

Referring now to FIG. 15, for example, the controller 1330 may generate an MPH function MPH2( ) based on one group of logical addresses L21 to L2r. In addition, the controller 1330 may update the translation information 130 for information of the MPH function MPH2( ) and may update the second correspondence information 150 for a correspondence relationship between the MPH function MPH2( ) and the logical addresses L21 to L2r (operation S150 of FIG. 11). For example, the MPH function MPH2( ) may be generated to respectively translate the logical addresses L21 to L2r to physical addresses P(r+1) to P2r of the memory region 1310b.

The controller 1330 may then invalidate the correspondence relationship of the first correspondence information 110a (operation S160 of FIG. 11). Accordingly, comparing FIG. 15 to FIG. 14, due to invalidation, the logical addresses L21 to L2r managed in the second correspondence information 150 are not managed in the first correspondence information 110a.

Logical addresses corresponding to the same MPH function may be translated to physical addresses for the same memory region. For example, the logical addresses L11 and L1r corresponding to the MPH function MPH1( ) may be translated to physical addresses P1 and Pr. The same memory region 1310a may include a memory location indicated by the physical address P1 and a memory location indicated by the physical address Pr.

Alternatively, logical addresses corresponding to different MPH functions may be translated to physical addresses for different memory regions. For example, the logical address L11 corresponding to the MPH function MPH1( ) may be translated to the physical address P1, and the logical address L21 corresponding to the MPH function MPH2( ) may be translated to the physical address P(r+1). The memory region 1310a including the memory location indicated by the physical address P1 may be different from the memory region 1310b including the memory location indicated by the physical address P(r+1).

An example of read/write operations performed after the write operation of FIG. 11 is completed will be described with reference to FIGS. 23 to 26.

V. Examples of Address Management Information

Figure 16:
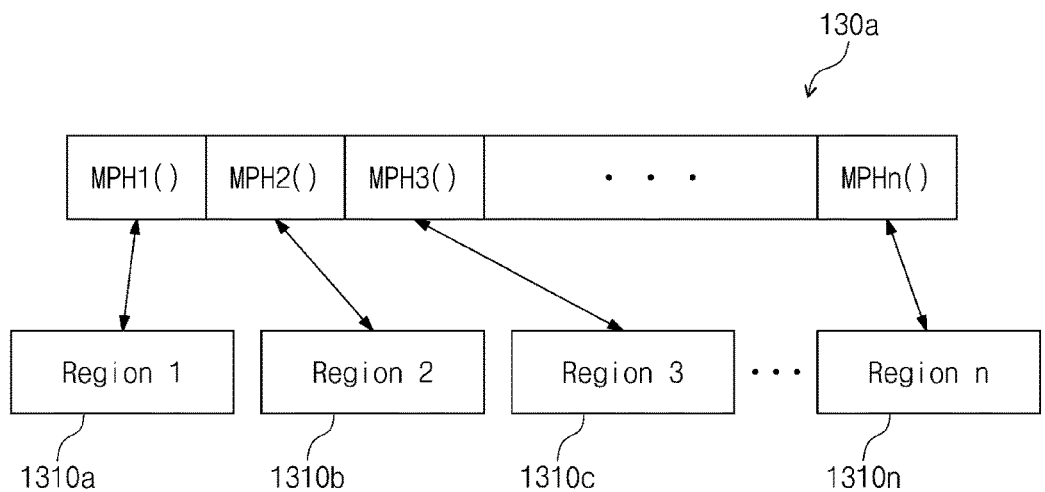
FIGS. 16 and 17 are conceptual diagrams for describing an example of relationships between the translation information of FIG. 5 and the memory devices of FIG. 2 according to exemplary embodiments of the present disclosure.
Figure 17:
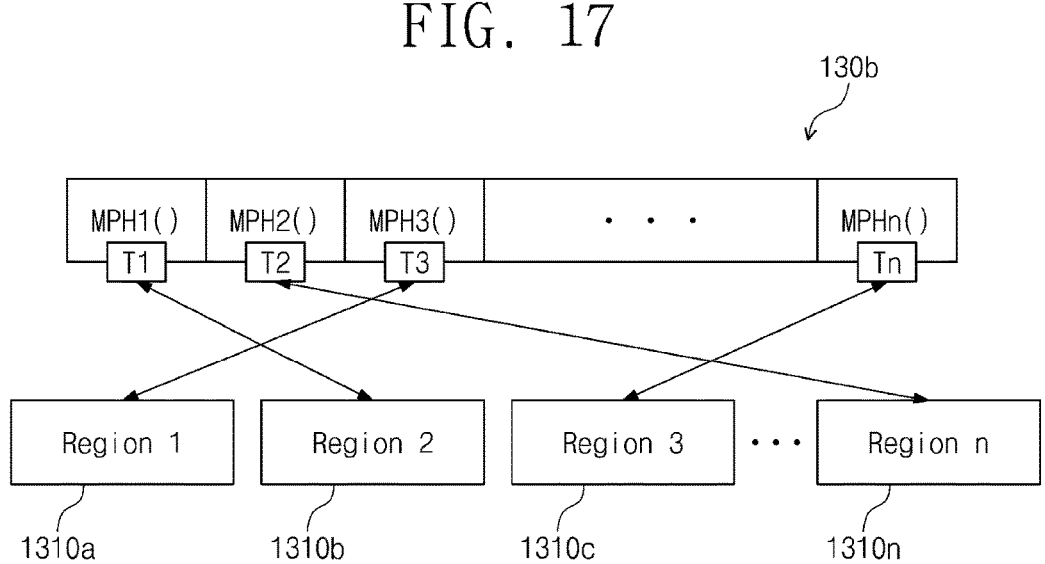

FIGS. 16 and 17 are conceptual diagrams for describing an example of relationships between the translation information 130 of FIG. 5 and the memory devices 1310 of FIG. 2 according to exemplary embodiments of the present disclosure.

The controller 1330 may manage the memory regions 1310a, 1310b, 1310c, . . . 1310n in units of a reference size in association with the translation information 130. The translation information 130 may include information of MPH functions MPH1( ) to MPHn( ), which respectively correspond to the memory regions 1310a, 1310b, 1310c, . . . 1310n. The controller 1330 may determine which memory region corresponds to a specific MPH function. That is, when the controller 1330 selects the specific MPH function, the controller 1330 may identify a memory region which corresponds to the selected MPH function.

Referring to FIG. 16, for example, the buffer memory 1350 of FIG. 2 may buffer information of the MPH functions MPH1( ) to MPHn( ) included in translation information 130a. In exemplary embodiments, the information of the MPH functions MPH1( ) to MPHn( ) may be buffered at fixed memory locations of the buffer memory 1350. For example, information of the MPH function MPH1( ) may be buffered only at a specific memory location of the buffer memory 1350 and may not be buffered at any other memory location.

In addition, memory locations of the memory regions 1310a, 1310b, 1310c, . . . 1310n may be also fixed on the memory devices 1310. For example, the memory region 1310a may be managed only at a specific memory location on the memory devices 1310 and may not be managed at any other memory location.

In exemplary embodiments, the controller 1330 may determine a memory region that corresponds to each of the MPH functions MPH1( ) to MPHn( ). This determination may be made based on fixed memory locations at which the information of the MPH functions MPH1( ) to MPHn( ) is buffered in the buffer memory 1350 and fixed memory locations of the memory regions 1310a, 1310b, 1310c, . . . 1310n of the memory devices 1310.

For example, a memory location at which the information of the MPH function MPH1( ) is buffered may uniquely correspond to a memory location of the memory region 1310a. In this example, when the controller 1330 receives a logical address corresponding to the MPH function MPH1( ), the controller 1330 may translate the received logical address to a physical address of the memory region 1310a. In such a manner, the MPH functions MPH1( ) to MPHn( ) may respectively correspond to the different memory regions 1310a, 1310b, 1310c, . . . 1310n.

Referring to FIG. 17, in exemplary embodiments, translation information 130b may include information of pointers T1 to Tn that are respectively associated with the MPH functions MPH1( ) to MPHn( ). The pointers T1 to Tn may be configured to respectively indicate memory locations of the memory regions 1310a, 1310b, 1310c, . . . 1310n which correspond to the MPH functions MPH1( ) to MPHn( ). Accordingly, the controller 1330 may determine a memory region which corresponds to each of the MPH functions MPH1( ) to MPHn( ) based on memory locations which are respectively indicated by the pointers T1 to Tn.

For example, the pointer T1 associated with the MPH function MPH1( ) may indicate a memory location of the memory region 1310b. In this example, when the controller 1330 receives a logical address which corresponds to the MPH function MPH1( ), the controller 1330 may translate the received logical address to a physical address of the memory region 1310b. In such a manner, the MPH functions MPH1( ) to MPHn( ) may correspond to the different memory regions 1310a, 1310b, 1310c, . . . 1310n.

In exemplary embodiments, memory locations at which the information of the MPH functions MPH1( ) to MPHn( ) is buffered in the buffer memory 1350 and memory locations of the memory regions 1310a, 1310b, 1310c, . . . 1310n on the memory devices 1310 may be dynamically changed without being fixed.

FIGS. 16 and 17 illustrate that one MPH function corresponds to one memory region. However, the present disclosure is not limited thereto. For example, in exemplary embodiments, one MPH function may be generated to correspond to a plurality of memory regions.

Figure 18:
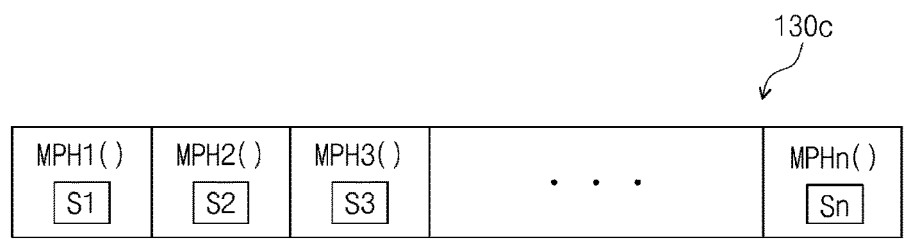
FIG. 18 is a conceptual diagram for describing an example of a configuration of the translation information of FIG. 5 according to exemplary embodiments of the present disclosure.

FIG. 18 is a conceptual diagram for describing an example of a configuration of the translation information 130 of FIG. 5 according to exemplary embodiments of the present disclosure.

In exemplary embodiments, translation information 130c may include information of seed values S1 to Sn which are respectively associated with the MPH functions MPH1( ) to MPHn( ). The seed values S1 to Sn may be used to generate the MPH functions MPH1( ) to MPHn( ) respectively. The information of each of the seed values S1 to Sn may indicate a seed value used to generate a respective MPH function.

The MPH function may be used to avoid hash collision. That is, exemplary embodiments provide a way to avoid hash collision by utilizing the MPH function without utilizing the seed values S1 to Sn. However, in certain scenarios, function values (or graphs similar to those illustrated in FIG. 7) obtained before generating the MPH function may excessively overlap each other, and it may be impossible to select different function values for all key values. In this case, changing a seed value may result in changing a function value, and thus, may be useful to avoid hash collision. As a result, the translation information 130*c* according to exemplary embodiments may include the information of the seed values S1 to Sn.

Figure 19:
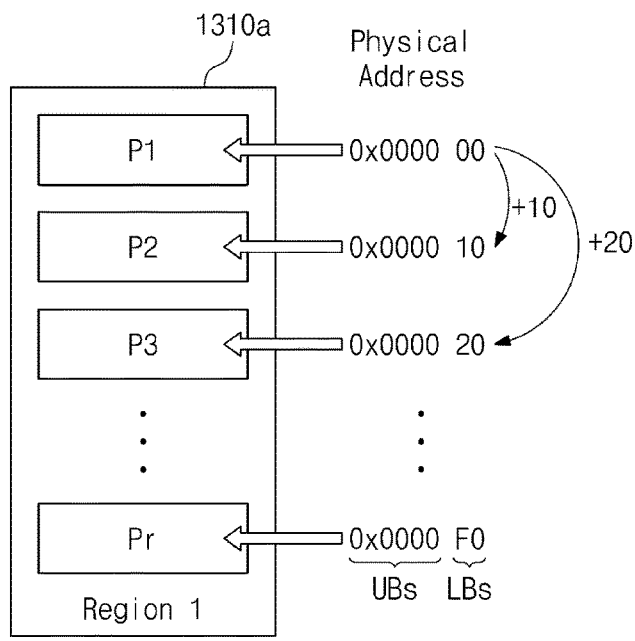
FIG. 19 is a conceptual diagram for describing an example of a configuration of a physical address handled in exemplary embodiments of the present disclosure.
Figure 20:
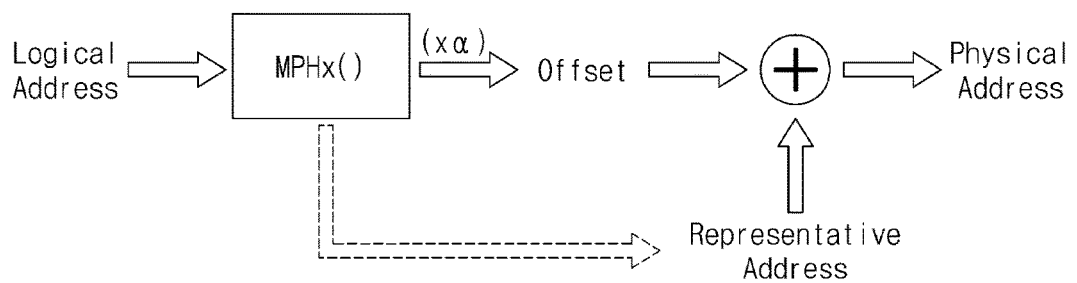
FIG. 20 is a conceptual diagram for describing an example of address translation performed based on the address management information of FIG. 5 according to exemplary embodiments of the present disclosure.

FIG. 19 is a conceptual diagram for describing an example of a configuration of a physical address handled in exemplary embodiments. FIG. 20 is a conceptual diagram for describing an example of address translation performed based on the address management information 100 of FIG. 5.

For example, the memory region 1310*a* may include memory locations indicated by the physical addresses P1 to Pr. When the memory region 1310*a* includes neighboring memory locations, the physical addresses P1 to Pr may have continuity or regularity.

Referring to FIG. 19, for example, the physical address P1 may be expressed by 0x000000, the physical address P2 may be expressed by 0x000010, the physical address P3 may be expressed by 0x000020, and the physical address Pr may be expressed by 0x0000F0. In this example, when memory locations are adjacent to each other, upper bits Ubs of the physical addresses P1 to Pr may be identically expressed with 0x0000.

Alternatively, lower bits LBs of the physical addresses P1 to Pr may be expressed differently. There may be an offset between the lower bits LBs. For example, there may be an offset of "+10" between the lower bits LBs of the physical addresses P1 and P2, and there may be an offset of "+20" between the lower bits LBs of the physical addresses P1 and P3.

When the upper bits UBs of the physical addresses P1 to Pr are identically expressed, each of the physical addresses P1 to Pr may be uniquely identified based only on the lower bits LBs. Alternatively, when a reference address is selected, each of the physical addresses P1 to Pr may be uniquely identified based only on an offset from the reference address. Accordingly, it may be allowable to manage only lower bits LBs and/or offsets, instead of managing full values of the physical addresses P1 to Pr. This may further decrease the amount of metadata referenced to perform address translation.

Referring to FIG. 20, the controller 1330 may obtain a physical address based on an MPH function and a logical address. To this end, the controller 1330 may select an MPH function MPHx( ) that corresponds to a logical address by referring to the second correspondence information 150. As described with reference to FIGS. 16 and 17, the controller 1330 may determine a memory region that corresponds to the MPH function MPHx( ) as selecting the MPH function MPHx( ).

In exemplary embodiments, the controller 1330 may obtain a representative address of the determined memory region. Herein, the representative address may mean a reference address to which an offset of FIG. 19 is to be applied. For example, the representative address may be selected as a physical address of the foremost memory location of the determined memory region. However, the present disclosure is not limited thereto. For example, selecting the representative address may be variously changed or modified (e.g., different addresses may be selected as the representative address).

The controller 1330 may obtain information of the selected MPH function MPHx( ) by referring the translation information 130. The controller 1330 may input the logical address to the selected MPH function MPHx( ). In exemplary embodiments, the MPH function MPHx( ) may be generated to output an offset for the input logical address. In such exemplary embodiments, the controller 1330 may calculate an offset for a logical address based on the MPH function MPHx( ) and the logical address. In some cases, the controller 1330 may correct or calibrate an output of the MPH functions MPHx( ) by a factor $\alpha$ to output a suitable offset.

The controller 1330 may then obtain a physical address based on the calculated offset and the representative address. Accordingly, the controller 1330 may translate a logical address to a physical address. The obtained physical address may indicate a memory location, which is spaced apart from the representative address by the calculated offset, in a memory region corresponding to the MPH function MPHx( ).

For example, referring to FIGS. 19 and 20, it will be assumed that the controller 1330 receives a logical address that is to be translated to the physical address P3. The controller 1330 may select the MPH function MPHx( ) corresponding to the received logical address. The controller 1330 may determine that the selected MPH function MPHx( ) corresponds to the memory region 1310*a*. For example, the controller 1330 may select the physical address P1 0x000000 of the foremost memory location of the determined memory region 1310*a* as the representative address.

The controller 1330 may input the received logical address to the selected MPH function MPHx( ). In some cases, the MPH function MPHx( ) may directly output an offset of +20. Alternatively, the MPH function MPHx( ) may output, for example, a value of 2 depending on a manner of generating the MPH function MPHx( ). In this case, the controller 1330 may correct or calibrate an output of the MPH function MPHx( ) ten (10) times (e.g., $\alpha=10$) to calculate the offset of +20.

The controller 1330 may obtain the physical address P3 0x000020 based on the representative address 0x000000 and the offset of +20. The physical address P3 may indicate a memory location that is spaced apart from the representative address (e.g., the physical address P1 0x000000) by the offset (+20) in the memory region 1310*a*. Accordingly, the controller 1330 may translate the received logical address to the physical address P3.

Figure 21:
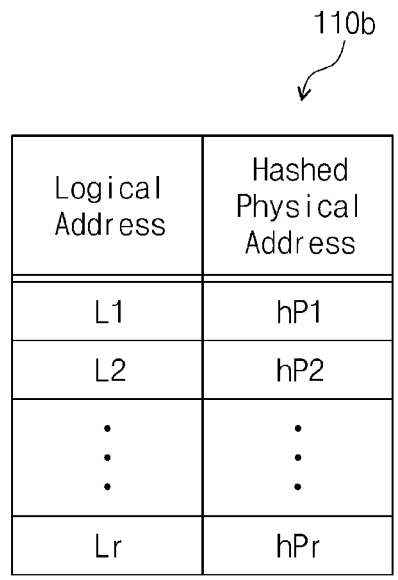
FIGS. 21 and 22 are conceptual diagrams for describing examples of configurations for the first correspondence information of the address management information of FIG. 5 according to exemplary embodiments of the present disclosure.
Figure 22:
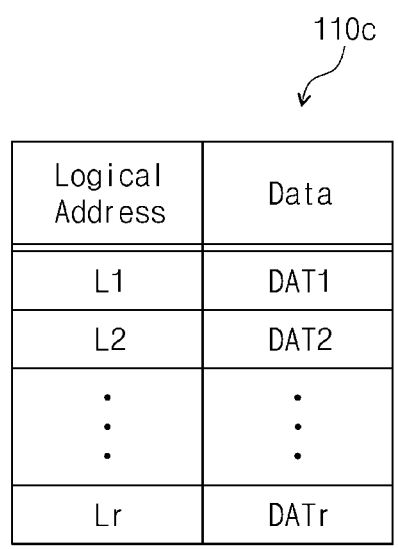

FIGS. 21 and 22 are conceptual diagrams for describing other examples of configurations for the first correspondence information 110*a* of the address management information 100 of FIG. 5 according to exemplary embodiments of the present disclosure.

The first correspondence information 110*a* described with reference to FIGS. 5 to 20 may directly indicate a correspondence relationship between logical addresses and physical addresses. However, the present disclosure is not limited thereto. For example, according to exemplary embodiments, a configuration of first correspondence information may be variously changed or modified.

Referring to FIG. 21, in exemplary embodiments, the address management information 100 may include first correspondence information 110*b*. The first correspondence information 110*b* may include information of hash values hP1 to hPr calculated from physical addresses, instead of including information of physical addresses corresponding to the logical addresses L1 to Lr. The first correspondence information 110*b* may be associated with a correspondence relationship between the logical addresses L1 to Lr and the hash values hP1 to hPr.

The hash values hP1 to hPr may be calculated by performing an operation of a hash function, which is selected in advance, on physical addresses which correspond to the logical addresses L1 or Lr. For example, the first correspondence information 110b may be implemented in a form of a cuckoo hash table. In some cases, different logical addresses may correspond to the same hash value. In these cases, for example, the controller 1330 may process hash collision based on a cuckoo hash algorithm.

Referring to FIG. 22, in exemplary embodiments, the address management information 100 may include first correspondence information 110c. The first correspondence information 110c may directly include data DAT1 to DATr associated with the logical addresses L1 to Lr, instead of including information of physical addresses corresponding to the logical addresses L1 to Lr. The first correspondence information 110c may be associated with a correspondence relationship between the logical addresses L1 to Lr and the data DAT1 to DATr.

In the example of FIG. 22, the data DAT1 to DATr received from the host 1100 may be managed in the first correspondence information 110c first. After an MPH function is generated, the data DAT1 to DATr may be stored in a memory region indicated by a physical address obtained based on the MPH function.

The first correspondence information 110a of FIG. 5 and the first correspondence information 110b of FIG. 21 may accompany the migration of data as the MPH function is being generated. Alternatively, the first correspondence information 110c of FIG. 22 may not accompany the migration of data.

VI. Example Following Read Operation

Figure 23:
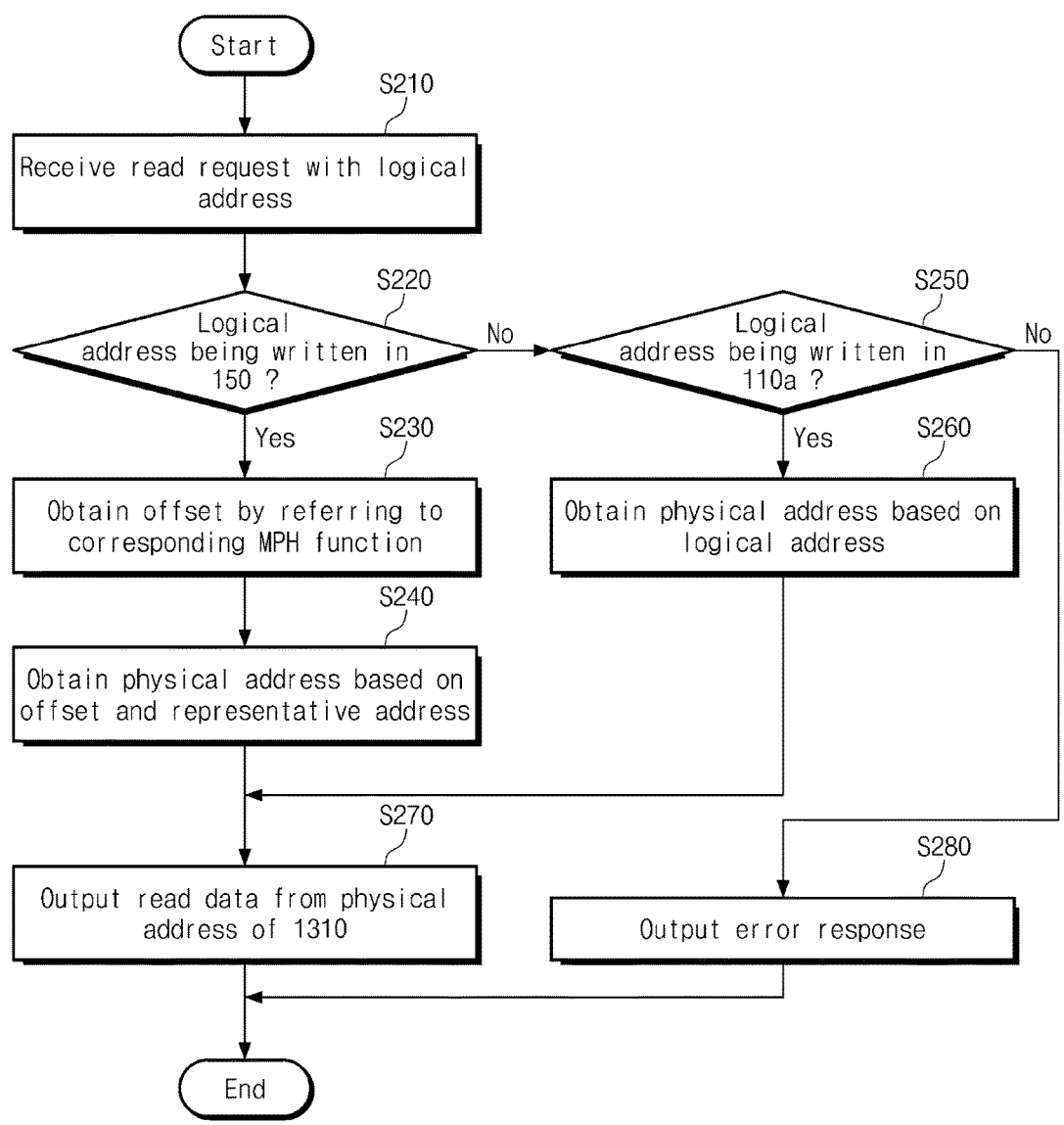
FIG. 23 is a flowchart describing an example of a read operation performed based on the address management information of FIG. 5 according to exemplary embodiments of the present disclosure.

FIG. 23 is a flowchart describing an example of a read operation performed based on the address management information 100 of FIG. 5 according to exemplary embodiments of the present disclosure. The example of the read operation of FIG. 23 may be performed after the example of the write operation described with reference to FIG. 11.

In operation S210, the controller 1330 may receive a read request (e.g., a read command) from the host 1100. The controller 1330 may receive a logical address from the host 1100 together with the read request. The logical address may indicate a memory location from which read data will be output.

In operation S220, the controller 1330 may determine whether the logical address received in operation S210 is written in the second correspondence information 150. When the controller 1330 previously generates an MPH function based on the received logical address, the received logical address may be managed in the second correspondence information 150.

When the logical address received in operation S210 is managed in the second correspondence information 150, operation S230 may be performed. In operation S230, the controller 1330 may select an MPH function which corresponds to the received logical address by referring to the second correspondence information 150. In addition, the controller 1330 may obtain information of the selected MPH function by referring to the translation information 130. The controller 1330 may obtain, for example, an offset that corresponds to the received logical address by using the selected MPH function.

In operation S240, the controller 1330 may obtain a representative address of a memory region which corresponds to the selected MPH function. In addition, the controller 1330 may obtain a physical address associated with the logical address received in operation S210 based on the offset and the representative address, accordingly, the controller 1330 may translate the logical address to a physical address based on the MPH function and the logical address (refer to FIG. 9).

When the logical address received in operation S210 is not managed in the second correspondence information 150, operation S250 may be performed. In operation S250, the controller 1330 may determine whether the logical address received in operation S210 is written in the first correspondence information 110a. For example, when the received logical address is not referenced to generate an MPH function, the received logical address may be managed in the first correspondence information 110a.

When the logical address received in operation S210 is managed in the first correspondence information 110a, operation S260 may be performed. In operation S260, the controller 1330 may obtain a physical address that corresponds to the logical address received in operation S210 by referring to the first correspondence information 110a (refer to FIG. 6).

After the physical address is obtained in operation S240 or operation S260, operation S270 may be performed. In operation S270, the controller 1330 may control the memory devices 1310 such that read data associated with the read request is output from a memory location indicated by the physical address obtained in operation S240 or operation S260.

Referring to FIGS. 14 and 23, the controller 1330 may receive a logical address managed in the first correspondence information 110a or the second correspondence information 150. For example, when the controller 1330 receives the logical address L11 managed in the second correspondence information 150, the controller 1330 may obtain the physical address P1 of the memory region 1310a based on the MPH function MPH1( ) that corresponds to the logical address L11 (refer to operation S220, operation S230, and operation S240 of FIG. 23). Under control of the controller 1330, read data may be output from a memory location indicated by the physical address P1.

For example, when the controller 1330 receives the logical address L21 managed in the first correspondence information 110a, the controller 1330 may obtain the physical address P21 of the memory region 1310c that corresponds to the logical address L21 (refer to operation. S250 and operation S260 of FIG. 23). Under control of the controller 1330, read data may be output from a memory location indicated by the physical address P21.

FIG. 23 describes that operation S220 is performed prior to operation S250. However, in exemplary embodiments, operation S250 may be performed prior to operation S220. Alternatively, operation S250 may be performed together with operation S220 (e.g., in parallel with operation S220, or at substantially the same time as operation S220).

In some cases, the logical address received in operation S210 is not managed in either the first correspondence information 110a or the second correspondence information 150. This may occur when, for example, a read request for data that is not stored is received. In these cases, in operation S280, the controller 1330 may output an error response to the host 1100.

VII. Example Following Write Operation

Figure 24:
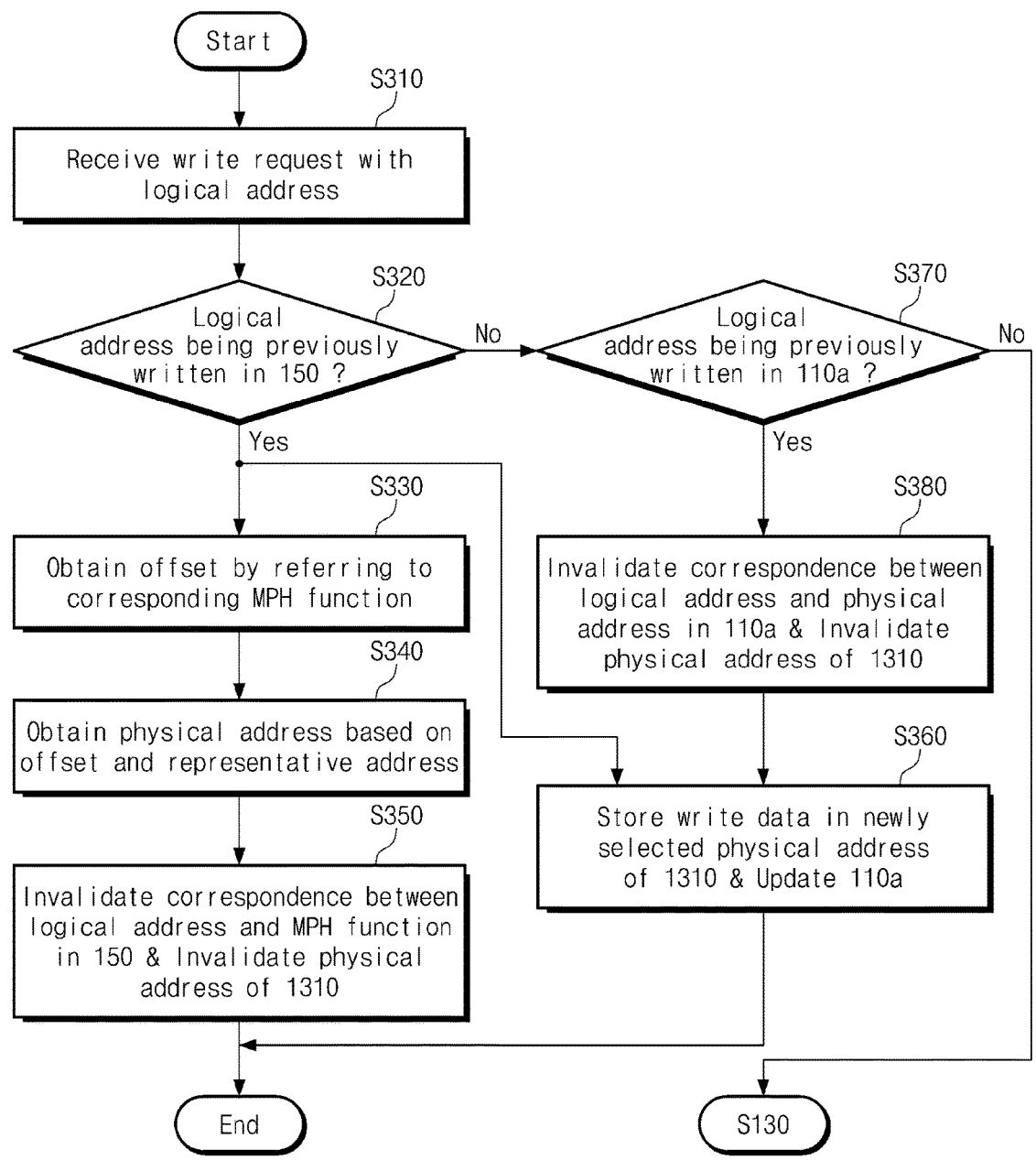
FIG. 24 is a flowchart describing an example of a write operation performed based on the address management information of FIG. 5 according to exemplary embodiments of the present disclosure.
Figure 25:
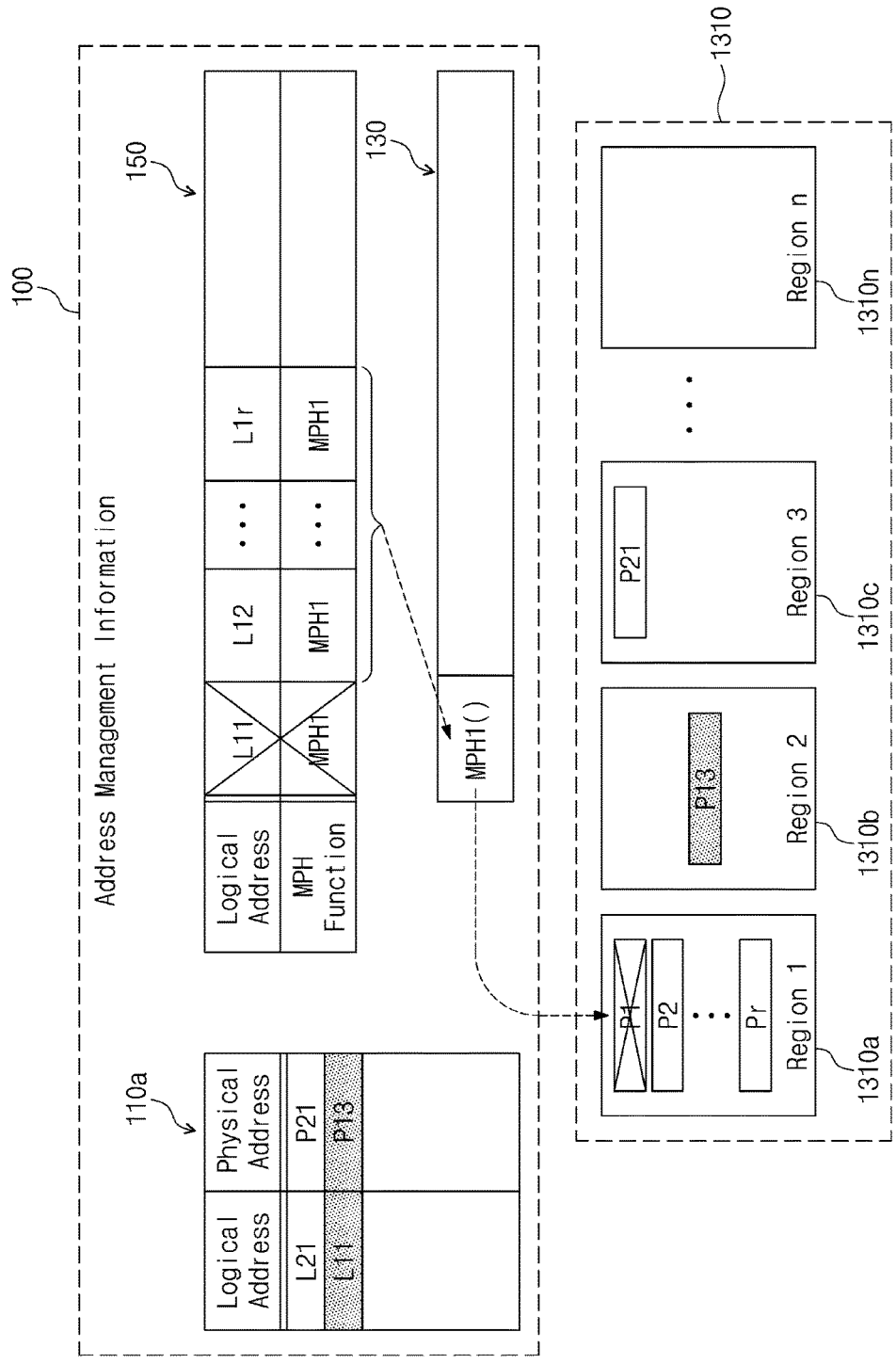
FIGS. 25 and 26 are conceptual diagrams for describing examples of configurations of the address management information of FIG. 5 according to the example of the write operation of FIG. 24 according to exemplary embodiments of the present disclosure.
Figure 26:
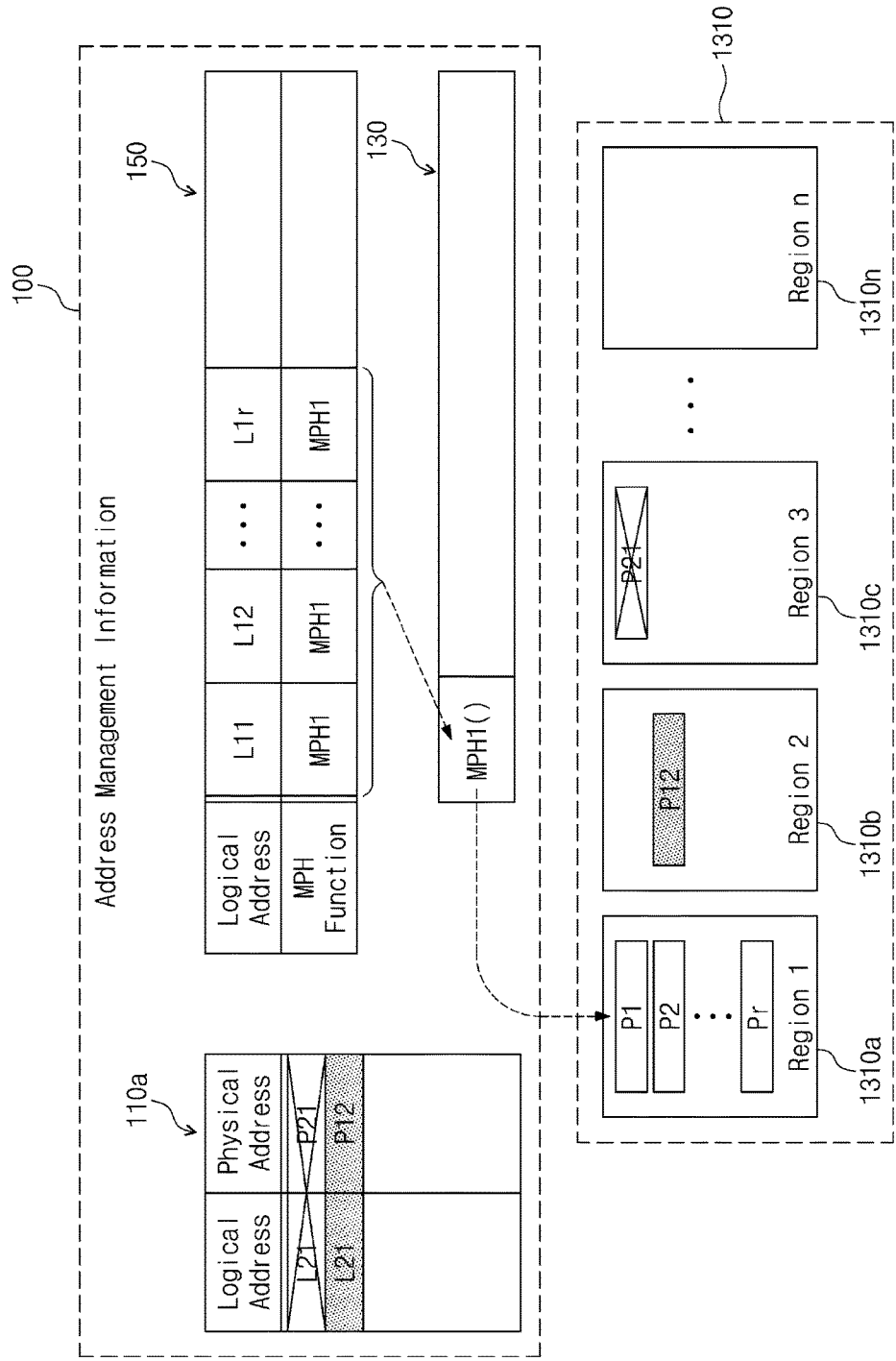

FIG. 24 is a flowchart describing an example of a write operation performed based on the address management information 100 of FIG. 5 according to exemplary embodiments of the present disclosure. FIGS. 25 and 26 are conceptual diagrams for describing examples of configurations of the address management information 100 of FIG. 5 according to the example of the write operation of FIG. 24 according to exemplary embodiments of the present disclosure. The example of the write operation described with reference to FIG. 24 may be performed after the example of the write operation described with reference to FIG. 11.

Referring to FIG. 24, in operation S310, the controller 1330 may receive a write request (e.g., a write command and write data) from the host 1100. The controller 1330 may receive a logical address from the host 1100 together with the write request. In some cases, the logical address received together with the write request may have been already managed in the first correspondence information 110a or the second correspondence information 150. This may occur when, for example, a write request for changing a value of previously stored data to a new value is received.

In operation S320, the controller 1330 may determine whether the logical address received in operation S310 has been previously written in the second correspondence information 150. When the received logical address is managed in the second correspondence information 150, operation S330 may be performed.

In operation S330, the controller 1330 may select an MPH function that corresponds to the received logical address by referring to the second correspondence information 150. In addition, the controller 1330 may obtain information of the selected MPH function by referring to the translation information 130. The controller 1330 may obtain, for example, an offset that corresponds to the received logical address by using the selected MPH function.

In operation S340, the controller 1330 may obtain a representative address of a memory region that corresponds to the selected MPH function. In addition, the controller 1330 may obtain a physical address associated with the logical address received in operation S310 based on the offset and the representative address. Accordingly, the controller 1330 may translate the logical address to a physical address based on the MPH function and the logical address (refer to FIG. 9).

In operation S350, the controller 1330 may invalidate a correspondence relationship of the second correspondence information 150. To change a value of previously stored data to a new value, the controller 1330 may release or cancel a previous correspondence relationship between a logical address and an MPH function. In addition, the controller 1330 may delete (or invalidate) data of a memory location indicated by the physical address obtained in operation S340. Deleting data may be immediately performed, or may be performed while a management operation (e.g., a garbage collection operation) is performed.

When the logical address received in operation S310 is managed in the second correspondence information 150, operation S360 may also be performed. In operation S360, the controller 1330 may control the memory devices 1310 such that write data is stored at a memory location indicated by a newly selected physical address. In addition, the controller 1330 may update the first correspondence information 110a such that the logical address received in operation S310 corresponds to the new physical address.

Referring to FIGS. 14 and 24, for example, the controller 1330 may receive the logical address L11 from the host 1100. The logical address L11 may have been already managed in the second correspondence information 150. This may occur when, for example, a write request for changing a value of data which has been previously stored in association with the logical address L11 to a new value is received.

Accordingly, referring to FIG. 25, the controller 1330 may obtain the previous physical address P1 associated with the logical address L11 based on the MPH function MPH1( ). The controller 1330 may invalidate a correspondence relationship between the logical address L11 and the MPH function MPH1( ) in the second correspondence information 150. The controller 1330 may delete (or invalidate) data of a memory location indicated by the previous physical address P1. The MPH function. MPH1( ) may be still managed in the translation information 130 for other logical addresses L12 to L1r used as key values.

In addition, the controller 1330 may control the memory devices 1310 such that write data is stored at a memory location indicated by a physical address P13 that is newly selected for the logical address L11. The controller 1330 may update the first correspondence information 110a to manage a correspondence relationship between the logical address L11 and the new physical address P13.

FIG. 24 describes that operation S360 is performed in parallel with operation S330, operation S340, and operation S350. However, in exemplary embodiments, operation S360 may be performed sequentially to (e.g., before or after) operation S330, operation S340, and/or operation S350.

When the logical address received in operation S310 is not managed in the second correspondence information 150, operation S370 may be performed. In operation S370, the controller 1330 may determine whether the logical address received in operation S310 has been previously written in the first correspondence information 110a. When the received logical address is managed in the first correspondence information 110a, operation S380 may be performed.

In operation S380, the controller 1330 may obtain a physical address that corresponds to the received logical address based on the first correspondence information 110a. The controller 1330 may invalidate the correspondence relationship of the first correspondence information 110a. To change a value of previously stored data to a new value, the controller 1330 may release or cancel a previous correspondence relationship between a logical address and a physical address. The controller 1330 may delete (or invalidate) data of a memory location indicated by the previous physical address.

In operation S360, the controller 1330 may control the memory devices 1310 such that write data is stored at a memory location indicated by a newly selected physical address. The controller 1330 may update the first correspondence information 110a such that the logical address received in operation S310 corresponds to the new physical address.

Referring to FIGS. 14 and 24, for example, the controller 1330 may receive the logical address L21 from the host 1100, and the logical address L21 may have already been managed in the first correspondence information 110a.

Accordingly, referring to FIG. 26, the controller 1330 may obtain the previous physical address P21 associated with the logical address L21 based on the first correspondence information 110a. The controller 1330 may invalidate a correspondence relationship between the logical address L21 and the physical address P21 in the first correspondence information 110a. The controller 1330 may delete (or invalidate) data of a memory location indicated by the previous physical address P21.

In addition, the controller 1330 may control the memory devices 1310 such that write data is stored at a memory location indicated by a physical address P12 that is newly selected for the logical address L21. The controller 1330 may update the first correspondence information 110a to manage a correspondence relationship between the logical address L21 and the new physical address P12.

FIG. 24 describes that operation S380 is performed prior to operation S360. However, in exemplary embodiments, operation S380 may be performed after operation S360. Alternatively, operation S380 may be performed together with operation S360 (e.g., in parallel with operation S360 or at substantially the same time as operation S360). In addition, FIG. 24 describes that operation S320 is performed prior to operation S370. However, in exemplary embodiments, operation S370 may be performed prior to operation S320. Alternatively, operation S370 may be performed together with operation S320 (e.g., in parallel with operation S320 or at substantially the same time as operation S320).

In some cases, the logical address received in operation S310 may not be managed in both the first correspondence information 110a and the second correspondence information 150. This may occur when, for example, a new logical address that is not yet managed is received. Accordingly, in these cases, operation S130 of FIG. 11 may be performed.

In the above description, processes of translating a logical address to a physical address are described. According to exemplary embodiments, in some cases, a physical address may be inversely translated to a logical address. To this end, since an MPH function provides a one-to-one correspondence, an inverse function of the MPH function may exist. For example, the controller 1330 may inversely translate a physical address to a logical address based on the inverse function of the MPH function.

While the present disclosure has been particularly shown and described with reference to the exemplary embodiments thereof, it will be understood by those skilled in the art that various changes in form and detail may be made therein without departing from the spirit and scope of the present disclosure as defined by the following claims.

What is claimed is:

1. A storage device, comprising:
a plurality of memory devices; and
a controller configured to translate a logical address received from a host to a physical address of the memory devices, wherein the logical address is one of a plurality of logical addresses and the physical address is one of a plurality of physical addresses,
wherein the controller is further configured to:
manage the logical addresses by referring to first correspondence information until a size of a memory region indicated by the logical addresses reaches a reference size, wherein the first correspondence information indicates correspondence relationships between the logical addresses and the physical addresses; and
manage the logical addresses by referring to second correspondence information and translation information that includes information of a minimal perfect hash (MPH) function when the memory region reaches the reference size,
wherein the MPH function is not generated until the size of the memory region reaches the reference size,
wherein the second correspondence information indicates a correspondence relationship between a specific one of the logical addresses and the MPH function, and the specific one of the logical addresses is used to generate the MPH function.

2. A storage device, comprising:
a plurality of memory devices; and
a controller configured to translate a logical address received from a host to a physical address of the memory devices, wherein the logical address is one of a plurality of logical addresses and the physical address is one of a plurality of physical addresses,
wherein the controller is further configured to:
manage first correspondence information associated with a correspondence relationship between the logical addresses and the physical addresses until a size of a first memory region in the memory devices reaches a reference size;
manage translation information that includes information of a minimal perfect hash (MPH) function when the size of the first memory region reaches the reference size, wherein the MPH function is not generated until the size of the first memory region reaches the reference size,
wherein the first memory region is indicated by logical addresses managed in the first correspondence information, and the MPH function is generated using the logical addresses indicating the first memory region as key values; and
manage second correspondence information associated with a correspondence relationship between the logical addresses used as the key values and the MPH function of the translation information when the size of the first memory region reaches the reference size.

3. The storage device of claim 2, wherein:
the controller is further configured to respectively map the logical addresses used as the key values to physical addresses of a second memory region in the memory devices by referring to the MPH function,
wherein a size of the second memory region is equal to the reference size, and a hash collision does not occur in response to mapping the logical addresses used as the key values to the physical addresses of the second memory region.

4. The storage device of claim 2, wherein:
when a first logical address from among the logical addresses used as the key values is received from the host, the controller is further configured to:
obtain the information of the MPH function corresponding to the first logical address by referring to the second correspondence information and the translation information; and
obtain a first physical address from among the physical addresses associated with the first logical address based on the MPH function and the first logical address.

5. The storage device of claim 4, wherein:
the controller is further configured to:
obtain a representative address of a memory region corresponding to the MPH function based on a selection of the MPH function from the second correspondence information;
calculate an offset based on the MPH function and the first logical address; and
obtain the first physical address based on the offset and the representative address.

6. The storage device of claim 5, wherein:
the first physical address indicates a memory location that is spaced apart from the representative address by the offset in the memory region corresponding to the MPH function.

7. The storage device of claim 2, wherein:
when a first logical address from among the logical addresses that is not used as the key values is received from the host, the controller is further configured to:

obtain a first physical address from among the physical addresses corresponding to the first logical address by referring to the first correspondence information.

8. The storage device of claim 2, wherein:
the controller is further configured to invalidate the correspondence relationship of the first correspondence information in response to the MPH function being generated, such that logical addresses managed in the second correspondence information are not managed in the first correspondence information.

9. The storage device of claim 2, wherein:
the controller is further configured to manage memory regions of the memory devices based on the translation information, and a size of each of the memory regions is equal to the reference size; and
the translation information further includes information of MPH functions that respectively correspond to the memory regions.

10. The storage device of claim 9, further comprising:
a buffer memory configured to buffer the information of the MPH functions,
wherein the controller is further configured to determine a memory region corresponding to each of the MPH functions based on memory locations at which the information of the MPH functions is buffered in the buffer memory, and memory locations of the memory regions in the memory devices.

11. The storage device of claim 9, wherein:
the translation information further includes information of pointers that are respectively associated with the MPH functions; and
the controller is further configured to determine a memory region of the memory devices corresponding to each of the MPH functions based on memory locations that are respectively indicated by the pointers.

12. The storage device of claim 2, wherein:
the translation information further includes information of a seed value used to generate the MPH function.

13. The storage device of claim 2, wherein:
the controller comprises a plurality of hash operation circuits that generate the MPH function.

14. A storage device, comprising:
a plurality of memory devices; and
a controller configured to control the memory devices based on a request and a logical address received from a host,
wherein the controller is further configured to:
 determine whether the received logical address is managed according to either one of first correspondence information indicating correspondence relationships between a first plurality of logical addresses and a plurality of physical addresses, or second correspondence information indicating correspondence relationships between a plurality of minimal perfect hash (MPH) functions and a second plurality of logical addresses,
wherein each of the plurality of MPH functions is generated based on one group of logical addresses,
wherein the MPH functions are not generated until a size of a memory region in the memory devices reaches a reference size,
wherein the received logical address is managed according to the first correspondence information until the size of the memory region reaches the reference size,
wherein the received logical address is managed according to the second correspondence information when the size of the memory region reaches the reference size; and obtain a physical address associated with the received logical address based on the received logical address and a selected MPH function corresponding to the received logical address from among the plurality of MPH functions when the received logical address is managed according to the second correspondence information.

15. The storage device of claim 14, wherein:
the controller is further configured to invalidate a correspondence relationship between the selected MPH function and the received logical address in the second correspondence information when the request includes a write request and the received logical address is managed according to the second correspondence information.

16. The storage device of claim 14, wherein:
when the request includes a write request and the received logical address is managed according to the first correspondence information, the controller is further configured to:
 obtain a physical address corresponding to the received logical address from among the plurality of physical addresses by referring to the first correspondence information; and
 invalidate a correspondence relationship between the received logical address and the corresponding physical address in the first correspondence information.

17. The storage device of claim 14, wherein:
when the request includes a write request, the controller is further configured to:
 control the memory devices such that write data associated with the write request is stored at a memory location of the memory devices that is indicated by a new physical address; and
 update the first correspondence information such that the received logical address corresponds to the new physical address.

18. The storage device of claim 14, wherein:
when the request includes a read request and the received logical address is managed according to the second correspondence information, the controller is further configured to:
 control the memory devices such that read data associated with the read request is output from a memory location of the memory devices that is indicated by the obtained physical address.

19. The storage device of claim 14, wherein:
when the request includes a read request and the received logical address is managed according to the first correspondence relationship, the controller is further configured to:
 obtain a physical address corresponding to the received logical address by referring to the first correspondence information; and
 control the memory devices such that read data associated with the read request is output from a memory location of the memory devices that is indicated by the corresponding physical address.

20. The storage device of claim 14, wherein:
when the request includes a read request and the received logical address is not managed according to either the first correspondence information or the second correspondence information, the controller is further configured to output an error response to the host.

* * * * *